(12) United States Patent
Sanchez et al.

(10) Patent No.: US 11,859,361 B1
(45) Date of Patent: Jan. 2, 2024

(54) MOLD FOR MAKING A REVETMENT MAT

(71) Applicant: PREMIER CONCRETE PRODUCTS, INC, Baton Rouge, LA (US)

(72) Inventors: Blaine S. Sanchez, Baton Rouge, LA (US); Cary S. Goss, Baton Rouge, LA (US)

(73) Assignee: PREMIER CONCRETE PRODUCTS, INC., Baton Rouge, LA (US)

( * ) Notice: Subject to any disclaimer, the term of this patent is extended or adjusted under 35 U.S.C. 154(b) by 0 days.

(21) Appl. No.: 17/350,377

(22) Filed: Jun. 17, 2021

Related U.S. Application Data

(63) Continuation of application No. 16/552,258, filed on Aug. 27, 2019, now Pat. No. 11,041,281, which is a continuation of application No. 15/819,664, filed on Nov. 21, 2017, now Pat. No. 10,392,764.

(51) Int. Cl.
*B29C 39/10* (2006.01)
*E02B 3/12* (2006.01)
*E02B 3/14* (2006.01)

(52) U.S. Cl.
CPC ............... *E02B 3/123* (2013.01); *B29C 39/10* (2013.01); *E02B 3/14* (2013.01)

(58) Field of Classification Search
CPC .................................................... B29C 39/10
See application file for complete search history.

(56) References Cited

U.S. PATENT DOCUMENTS

| | | | | |
|---|---|---|---|---|
| 4,370,075 A * | 1/1983 | Scales | ..................... | E01C 9/004 405/20 |
| 4,375,928 A * | 3/1983 | Crow | ..................... | E02B 3/123 405/20 |
| 4,499,664 A * | 2/1985 | Scales | ..................... | E02B 3/123 29/241 |
| 5,108,222 A * | 4/1992 | Jansson | ................... | E02B 3/123 D25/138 |
| 5,632,571 A * | 5/1997 | Mattox | ..................... | E02B 3/14 405/20 |
| 8,858,118 B2 * | 10/2014 | Benton, Jr. | ............. | E02B 3/123 405/20 |
| 9,518,366 B2 * | 12/2016 | Benton, Jr. | ............. | E02B 3/123 |
| 2002/0180076 A1 * | 12/2002 | Motz | ................... | B28B 23/0012 425/122 |
| 2013/0279983 A1 * | 10/2013 | Benton, Jr. | ........... | B28B 7/0064 405/20 |

* cited by examiner

*Primary Examiner* — Edmund H Lee
(74) *Attorney, Agent, or Firm* — ROY KIESEL FORD DOODY & NORTH, APLC

(57) ABSTRACT

A method to produce a revetment mat. The method comprises the following steps: (a) positioning a first side of a grid adjacent to a mold; (b) positioning a frame adjacent to the second side of the grid opposite the mold to form a plurality of block casting impressions, wherein each block casting impression contains a portion of the grid; (c) filling the plurality of block casting impressions with a composite fill; (d) curing the composite fill, embedding within it the grid, to form a revetment mat; and (e) removing the revetment mat form the mold and the frame.

8 Claims, 23 Drawing Sheets

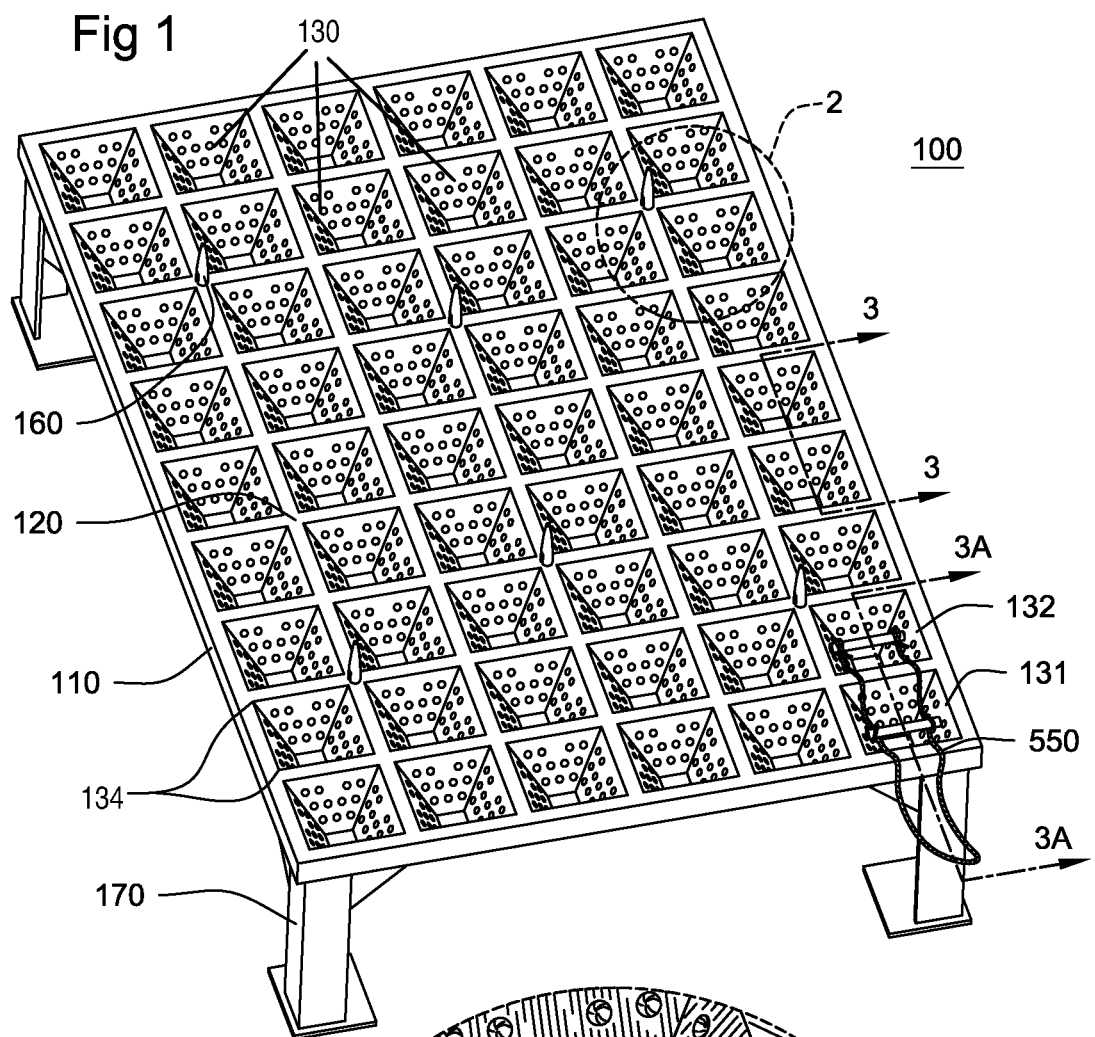
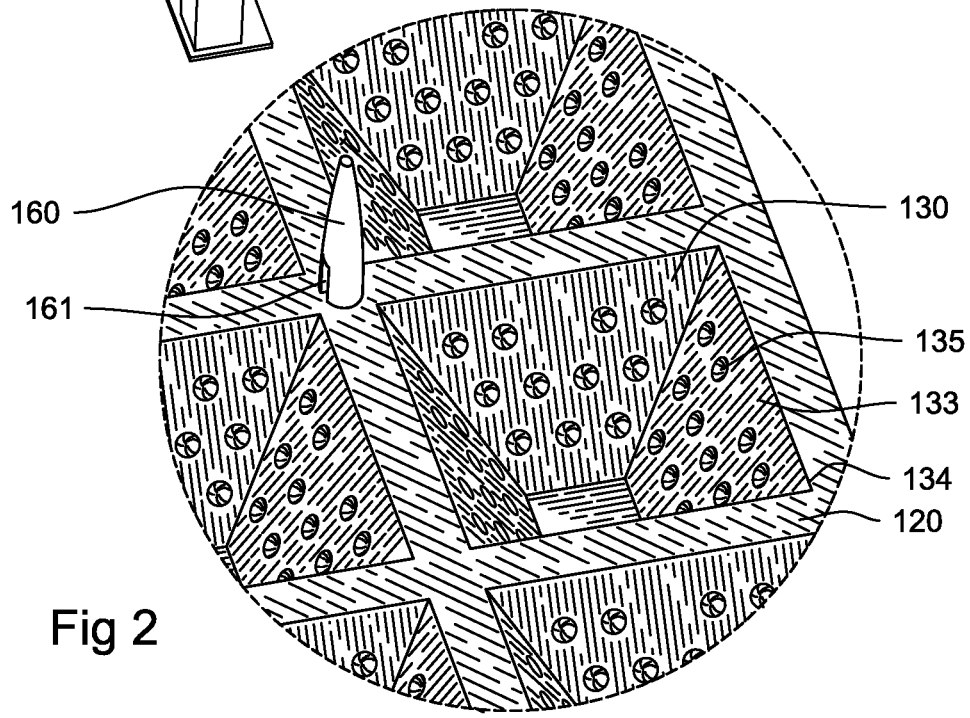

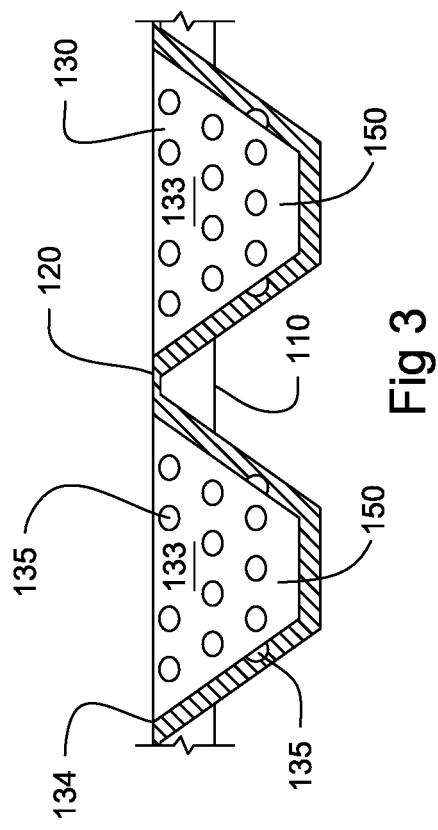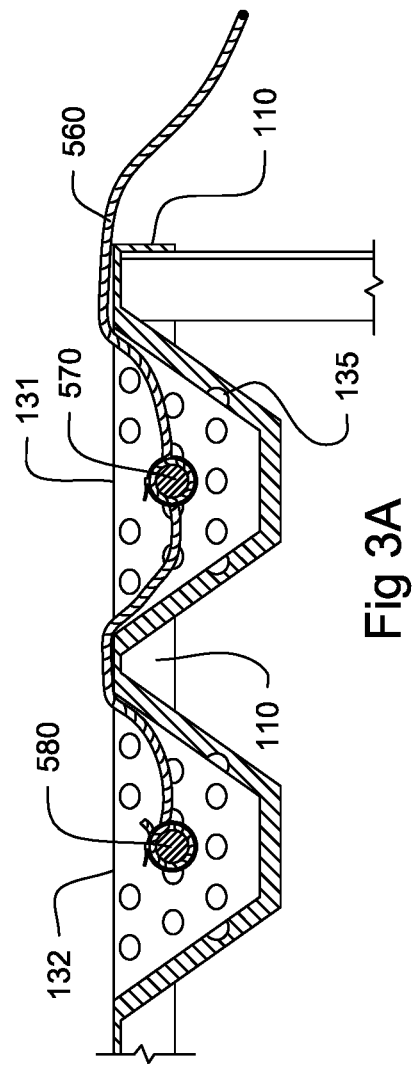

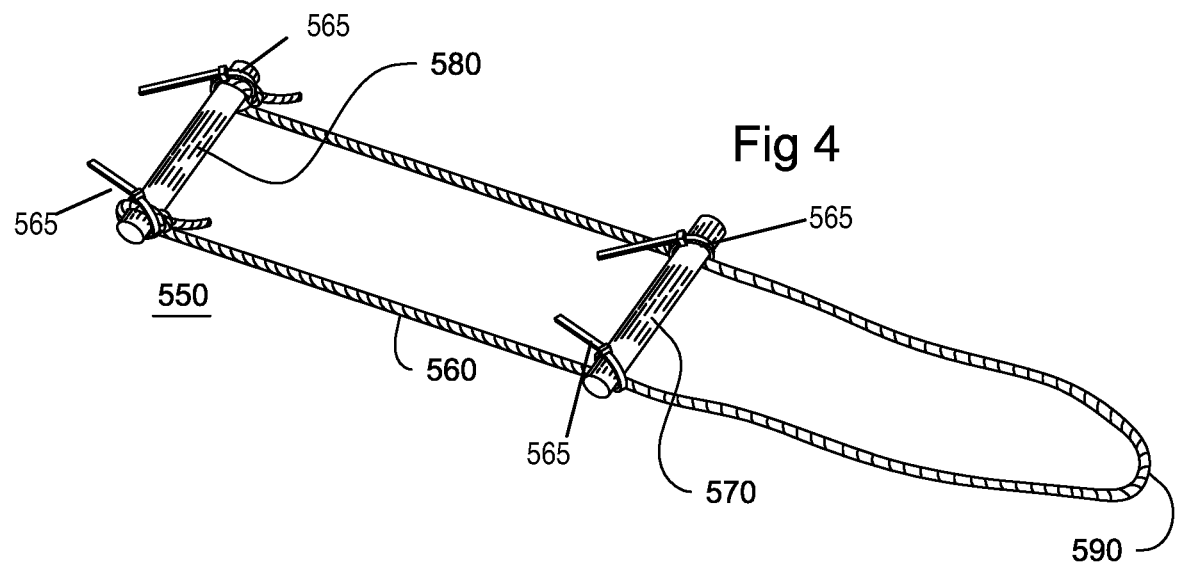
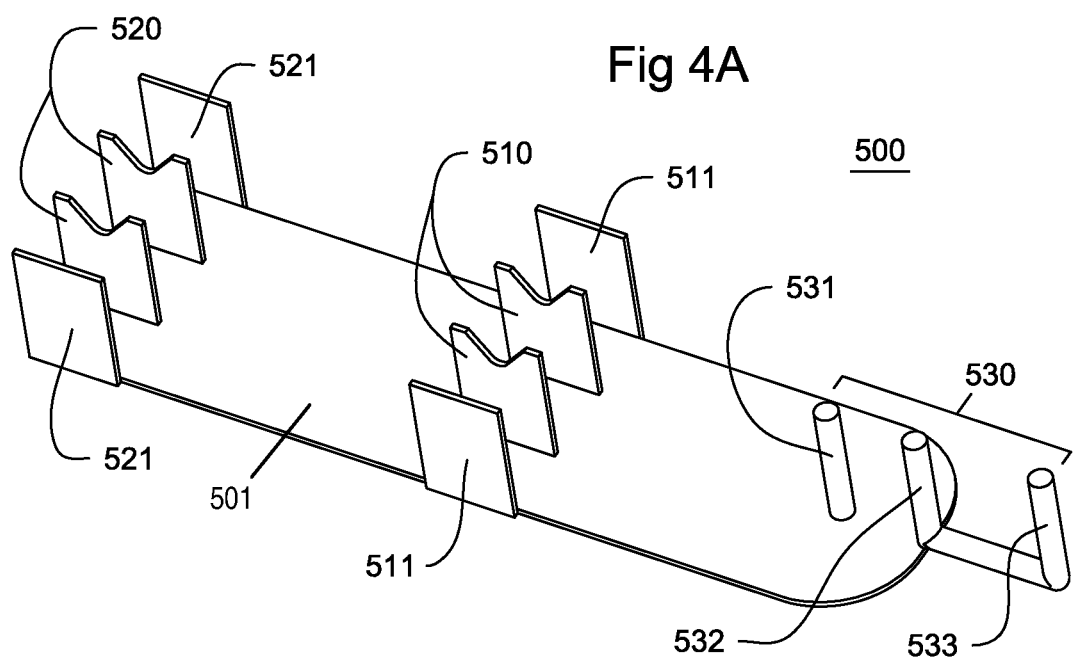

MOLD FOR MAKING A REVETMENT MAT

CROSS REFERENCE TO RELATED APPLICATION

This application claims benefit of U.S. patent application Ser. No. 16/552,258, filed on Aug. 27, 2019 issuing as U.S. Pat. No. 11,041,281 on Jun. 22, 2021, which claimed benefit to U.S. patent application Ser. No. 15/819,664, filed Nov. 21, 2017, which issued as U.S. Pat. No. 10,392,764 on Aug. 27, 2019, both of which are hereby incorporated by reference in their entirety.

BACKGROUND OF THE INVENTION

Field of Invention

Various embodiments relate to a method for the production of a revetment mat used to protect of earthen surfaces from fluid or hydraulic erosion. Various embodiments relate to a method for the production of a revetment mat including a plurality of revetment blocks arranged in an array and embedded on a common grid. Various embodiments relate to a method for the production of a revetment mat wherein a plurality of revetment blocks are simultaneously cast, each revetment block having embedded within it a section of a common grid.

General Background of the Invention

It is well known that fluid (gaseous or aqueous) erosion increases as the velocity of fluid flowing across earthen surfaces increases. It is also well know that revetment mats decrease the velocity of fluid thereby impeding fluid erosion It is also well known in the prior art that revetment mats are created and installed in several ways. One method of producing a revetment mat is known wherein block are cast individually then subsequently installed in an array on the earthen surface.

Another method of producing a revetment mat is known wherein blocks are cast individually then subsequently cabled together to form a mat. Cabling can be done before or after the blocks are installed in an array on the earthen surface subject to fluid erosion.

There is a need in the art for a method to produce a revetment mat wherein the casting process results in a connected arrangement of the blocks.

A method exists teaching a casting process producing a connected arrangement of blocks. See herein incorporated by reference U.S. patent Ser. No. 10/239,240. However, the method disclosed requires complex machinery with limited application.

There is a need in the art to provide for a method to produce a revetment wherein the casting process of each block results in a connected arrangement of the blocks that does not require complex machinery with limited application.

SUMMARY OF THE INVENTION

Various embodiments relate to a method to produce a composite revetment mat.

The method comprises the following steps: (a) positioning a first side of a grid adjacent to a mold; (b) positioning a frame adjacent to the second side of said grid opposite said mold to form a block casting impression containing a portion of said grid; (c) filling said block casting impression with a composite fill; (d) curing said composite fill embedding said grid within to form a revetment mat; and (e) removing said revetment mat form said mold and said frame.

BRIEF DESCRIPTION OF THE DRAWINGS

FIG. 1 is a view of one embodiment of a mold that may be used in the method comprising a plurality of casting impressions.

FIG. 2 is a view of the mold of FIG. 1 through Window 2 shown in FIG. 1.

FIG. 3 is a view of the mold of FIG. 1 down Line 3 shown in FIG. 1 showing the cross section of two adjacent casting impressions.

FIG. 3A is a view of the mold of FIG. 1 down line 3A shown in FIG. 1 showing the cross section of two adjacent casting impressions with one embodiment of a handle positioned within the casting impressions.

FIG. 4 is a view of the one embodiment of the handle shown in FIG. 3A that may be used in the method.

FIG. 4A is a view of one embodiment of a frame that may be used to make the handle shown in FIG. 4.

DETAILED DESCRIPTION

The figures provided herein depicts two preferred embodiment of the method among a plurality of preferred embodiments for the production of revetment mat 1000 comprising grid 200 embedded into a plurality of blocks 1010.

Figure 10:
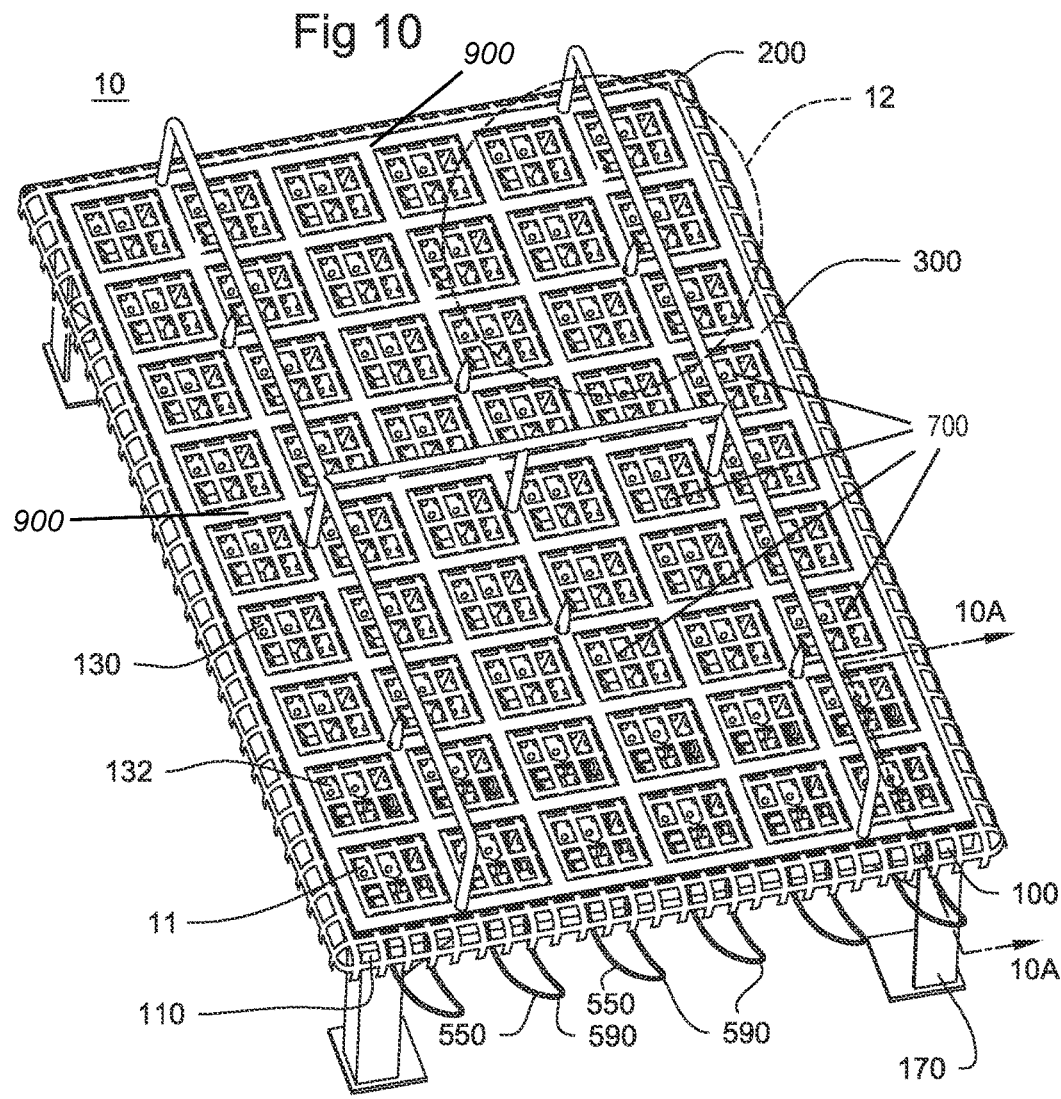
FIG. 10 is a view of the frame shown in FIG. 9 being positioned adjacent the grid and the mold shown in FIG. 6.
Figure 10A:
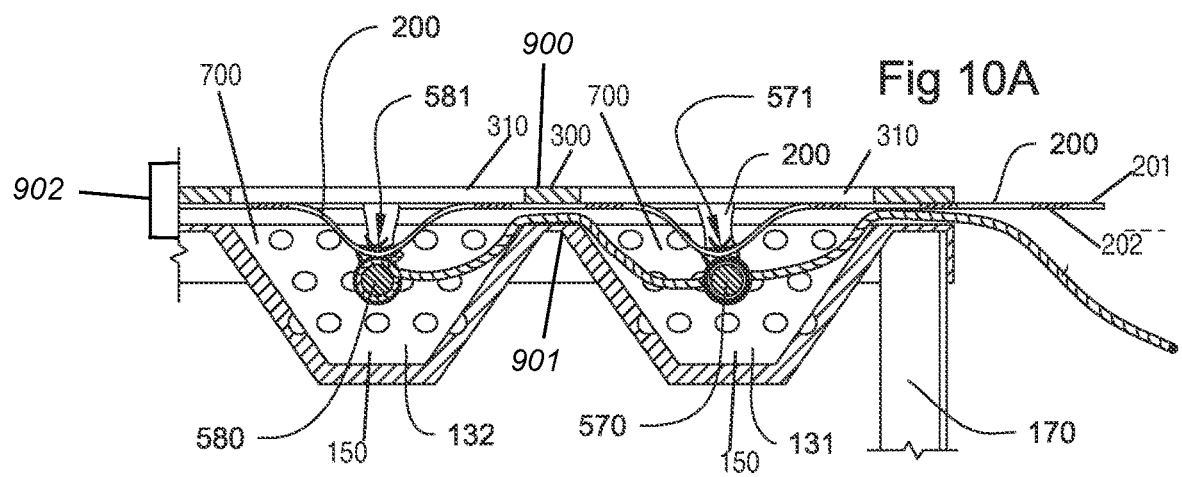
FIG. 10A is a view down line 10A shown in FIG. 10 showing the cross section of two adjacent casting impressions, a handle similar to the one shown in FIG. 4 positioned adjacent the mold, the grid positioned adjacent to the mold, the anchors tied to the grid, and frame positioned adjacent the grid.
Figure 11:
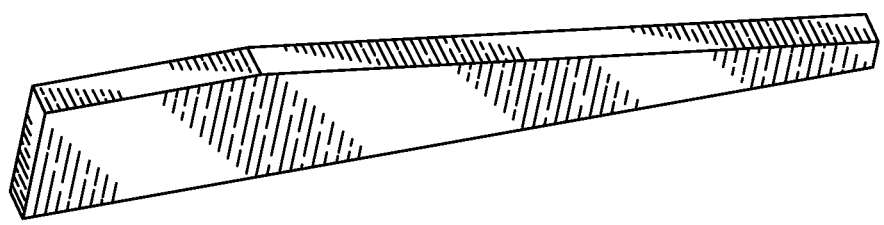
FIG. 11 is a view of one embodiment of a wedge.

Viewing now FIGS. 10 and 10A, to form a plurality of casting block volumes 700 with each volume containing a section of grid 200 to be imbedded, first side 201 of grid 200 is positioned adjacent to mold 100 and frame 300 is positioned adjacent second side 202 of grid 200 opposite mold 100. Mold 100, grid 200 and frame 300 are further described in detail.

Viewing now FIG. 1, the method employs mold 100. In various embodiments, mold 100 comprise side wall 110 forming a mold perimeter, a mold surface 120 affixed to side wall 110, and at least one casting impression 130 affixed to mold surface 120 such that mold surface 120 forms a border between casting impressions.

In various embodiments as depicted in the figures, mold 100 comprises a plurality of casting impressions 130 arranged in a six (6) by nine (9) array. It should be understood that mold 100 could comprises a variety of arrangements, such that mold 100 may include only one casting impression 130 or may include another arrangement such as an array of five (5) by ten (10) casting impressions 130. Further it should be understood that several molds 100 may be positioned adjacent to one another to form a larger revetment mat then a single mold may create. For example, FIGS. 22 through 27 depict various steps in one embodiment of the method wherein six (6) molds 100, each having a plurality of casting impressions arranged in a six (6) by nine (9) array, are positioned adjacent one another in a two (2) by three (3) arrangement to create revetment mat 1000. Further, it should be understood that while a plurality of molds 100 each comprising only one (1) casting impression could be positioned adjacent to one another to form a revetment mat, it is a preferred embodiment to use a mold with a plurality of casting impressions. Further, when two or more molds 100 are positioned adjacent to one another, in various embodiments side wall 110 and perimeter 111 of molds 100 are configured to facilitate one mold 100' being positioned adjacent to another mold 100". For example flush side walls 110 and a rectilinear perimeter 111 of molds 100 would facilitate positioning one mold 100' adjacent to another mold 100". When two or more molds 100 are positioned adjacent to one another, in various embodiments, mold surface 120 of one mold 100' is positioned adjacent to and long the same plane as a second mold surface 120 of a another mold 100".

Viewing now FIGS. 2 and 3, in various embodiments, casting impression 130 comprises impression wall 133 affixed to mold surface 120, opening 134 at mold surface 120, and casting impression volume 150 defined by impression wall 133 and opening 134. In various embodiments, impression wall 133 comprises hydraulic jump impressions 135. It is well known in the art that hydraulic jumps impede fluid flow.

Figure 6:
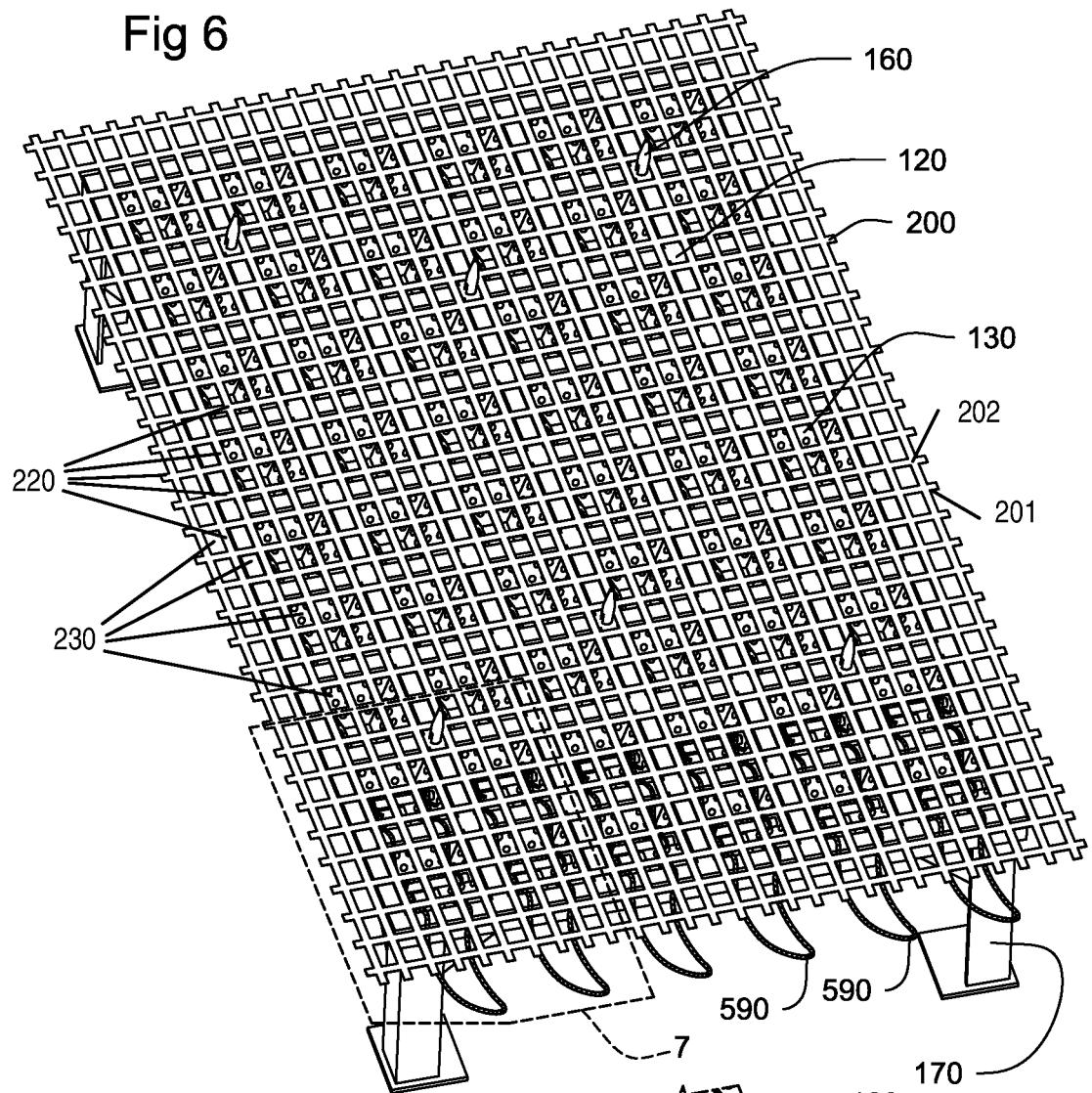
FIG. 6 is a view of one embodiment of a grid that may be used in the method positioned adjacent to the mold shown in FIG. 1.
Figure 7:
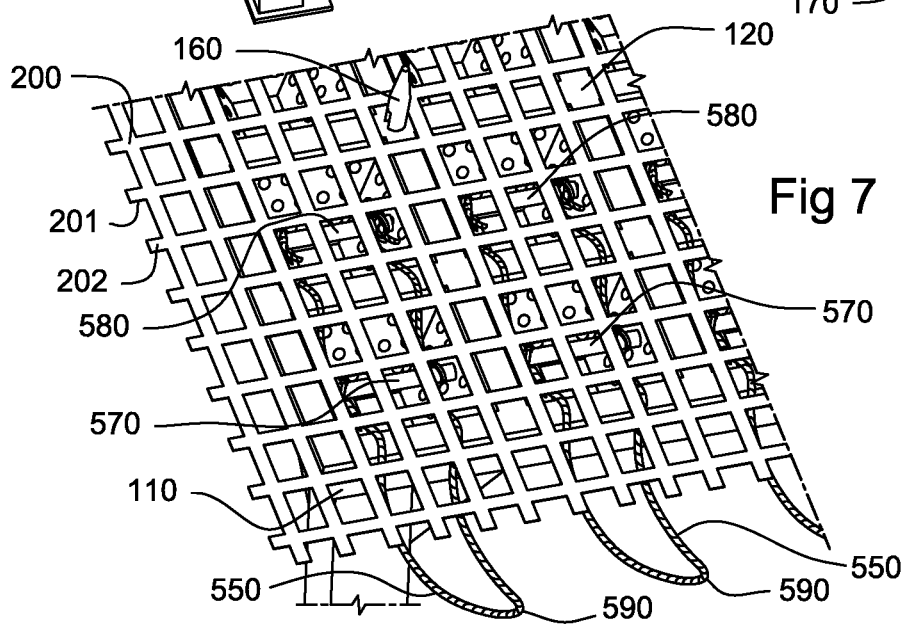
FIG. 7 is a view through Window 7 show in FIG. 6 showing of the grid, the mold and at least two handles, all shown in FIG. 6.

Viewing now FIG. 6, the method employs grid 200. In FIG. 6, first side 201 of grid 200 has been positioned adjacent to mold 100. In various embodiments, grid 200 comprises plurality of elements 220 extending from at least one edge of the grid, and a plurality of apertures 230 formed between the plurality of elements 220. In various embodiments, the apertures 230 have an aperture radius defined by the largest sphere which may pass through the narrowest point of the aperture 230 without contacting the elements 220 forming the aperture 230. In various embodiments, aperture radius falls anywhere in the range of 0.75 inches and one (1) inch. In various embodiments, said elements 220 comprise of poly-propylene fibers.

When first side 201 of grid 200 is positioned adjacent to a mold 100, the first side 201 of grid 200 is positioned adjacent to mold surface 120. Further, when a first side 201 of grid 200 is positioned adjacent to a mold 100, the first side 201 of grid 200 is also positioned adjacent to casting impression openings 134 at mold surface.

Figure 23:
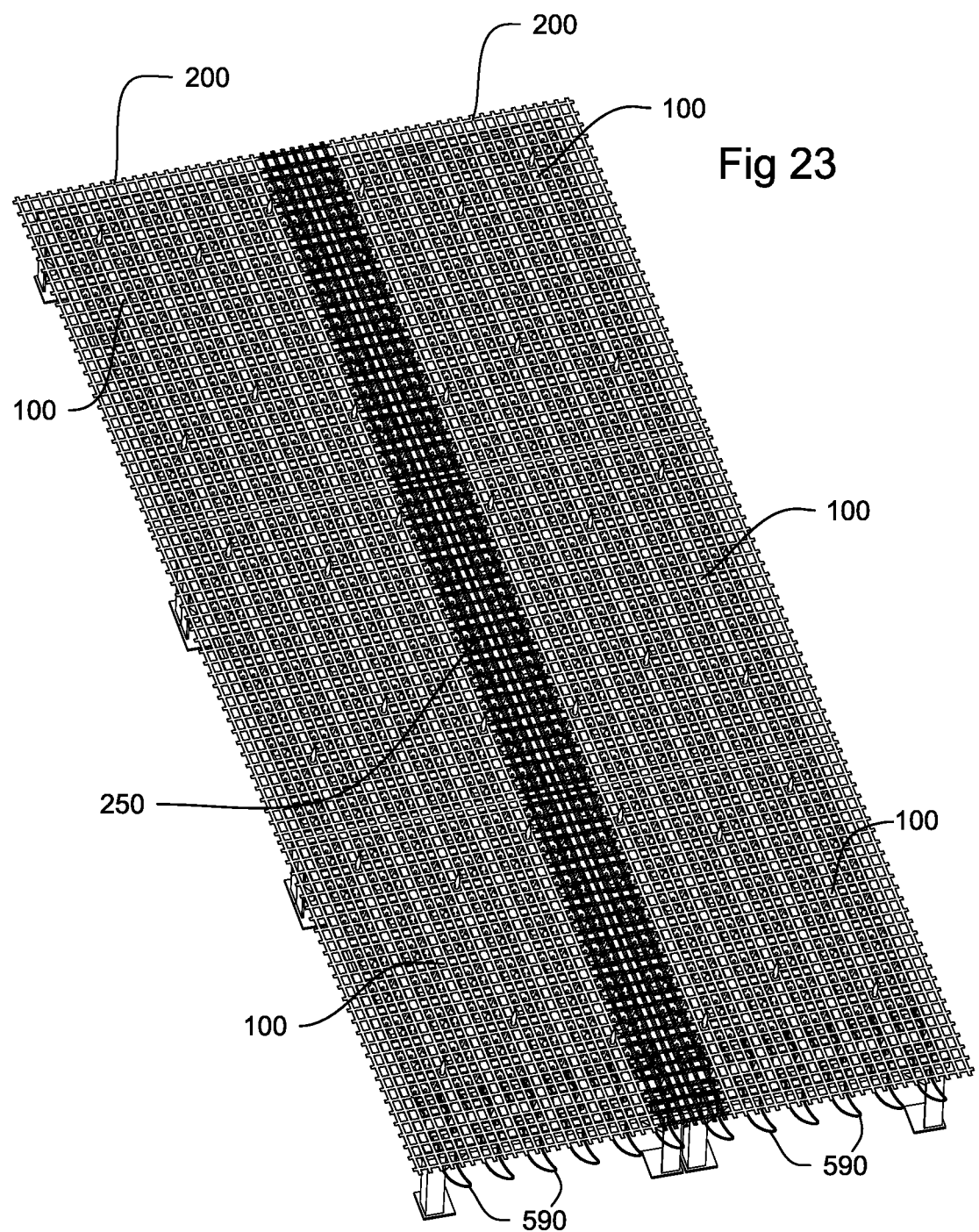
FIG. 23 is a view of two sections of grid positioned adjacent the six molds shown in FIG. 22.
Figure 24:
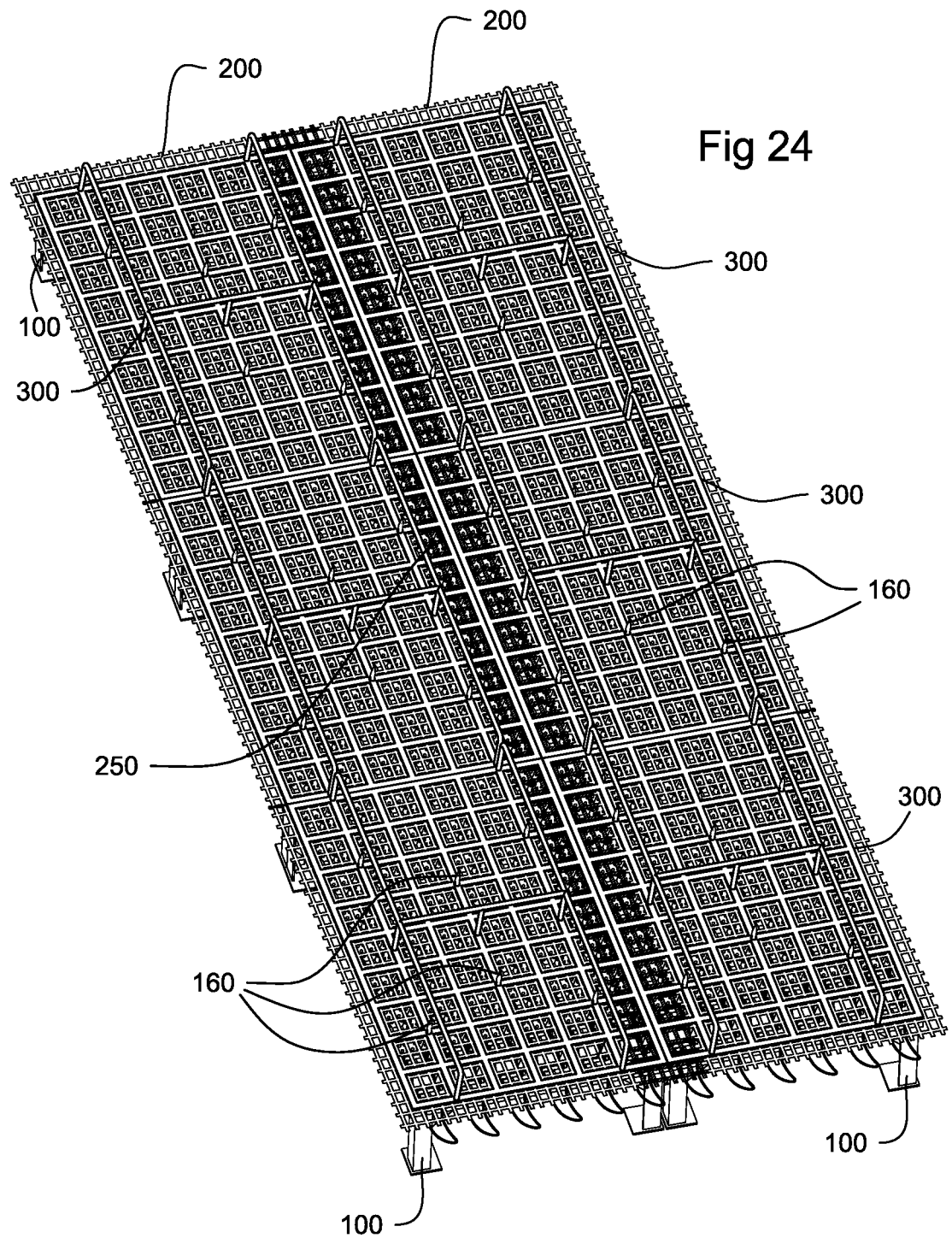
FIG. 24 is a view of six frames, each frame similar to the one shown in FIG. 9, positioned adjacent to the six molds shown in FIG. 22 opposite the two grids shown in FIG. 23.
Figure 25:
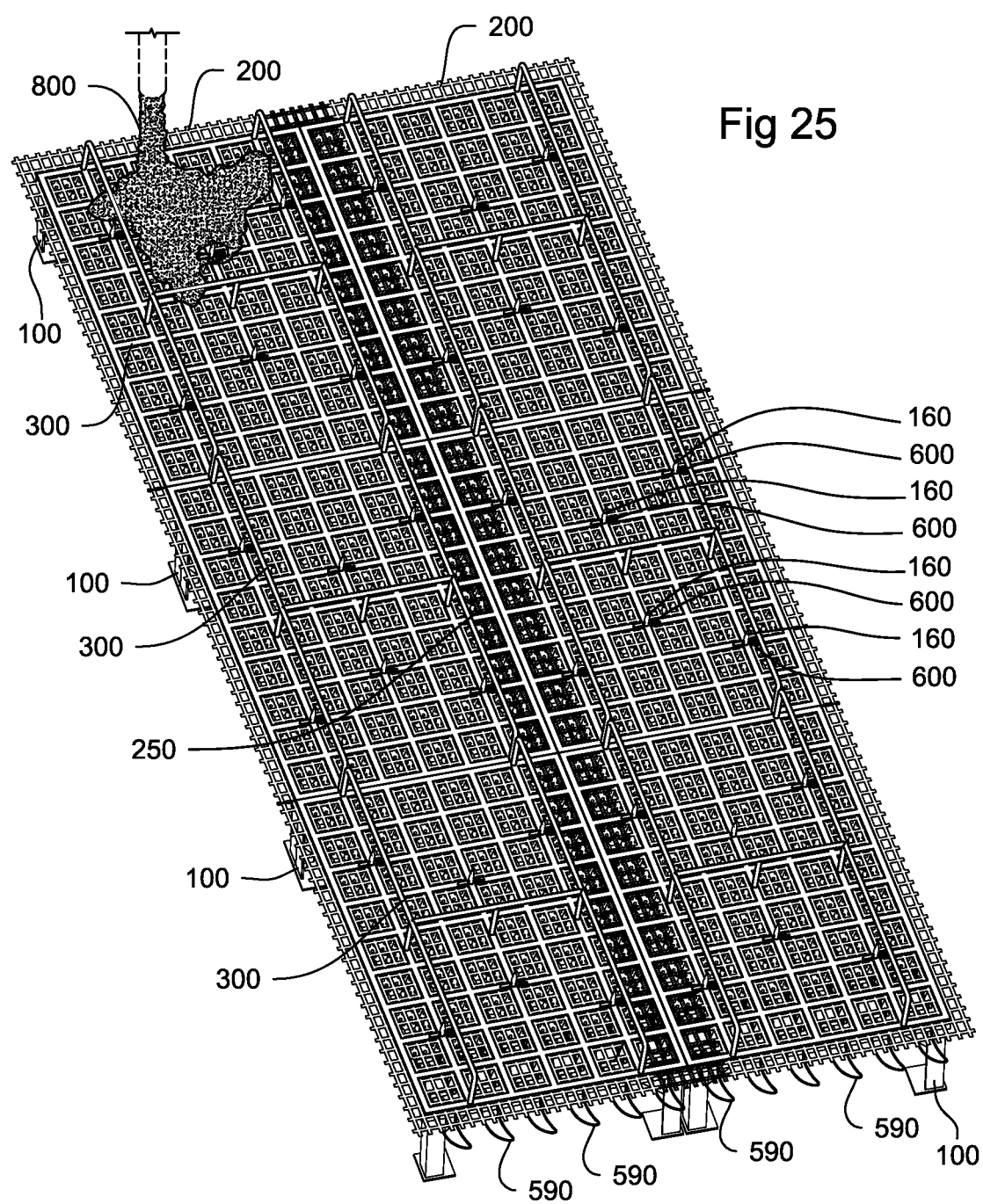
FIG. 25 is a view of one embodiment of composite fill being poured through the six frames and into the six molds shown in FIG. 24.
Figure 26:
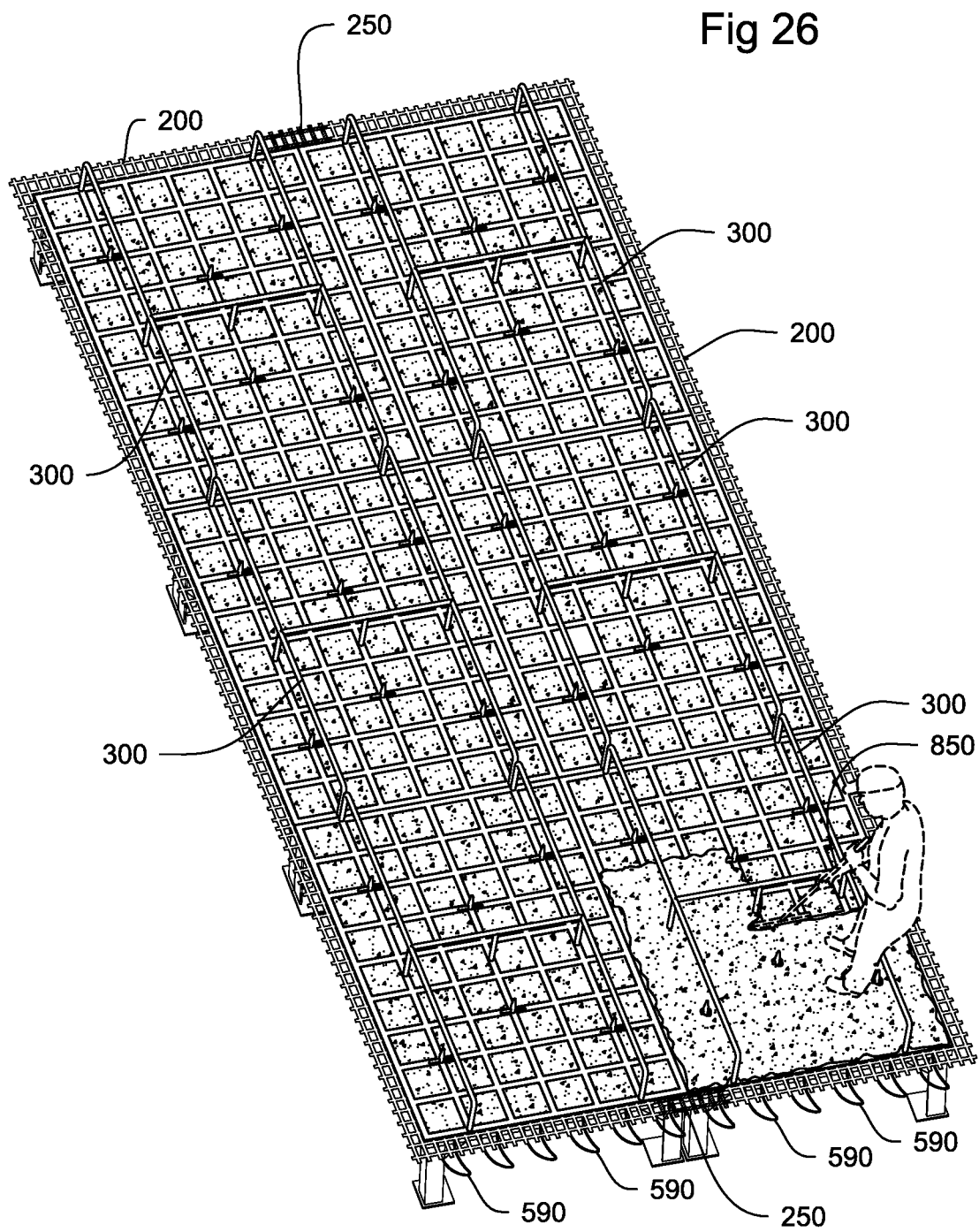
FIG. 26 is a view of a person screeding composite fill across the surface of the six frames shown in FIG. 24.
Figure 27:
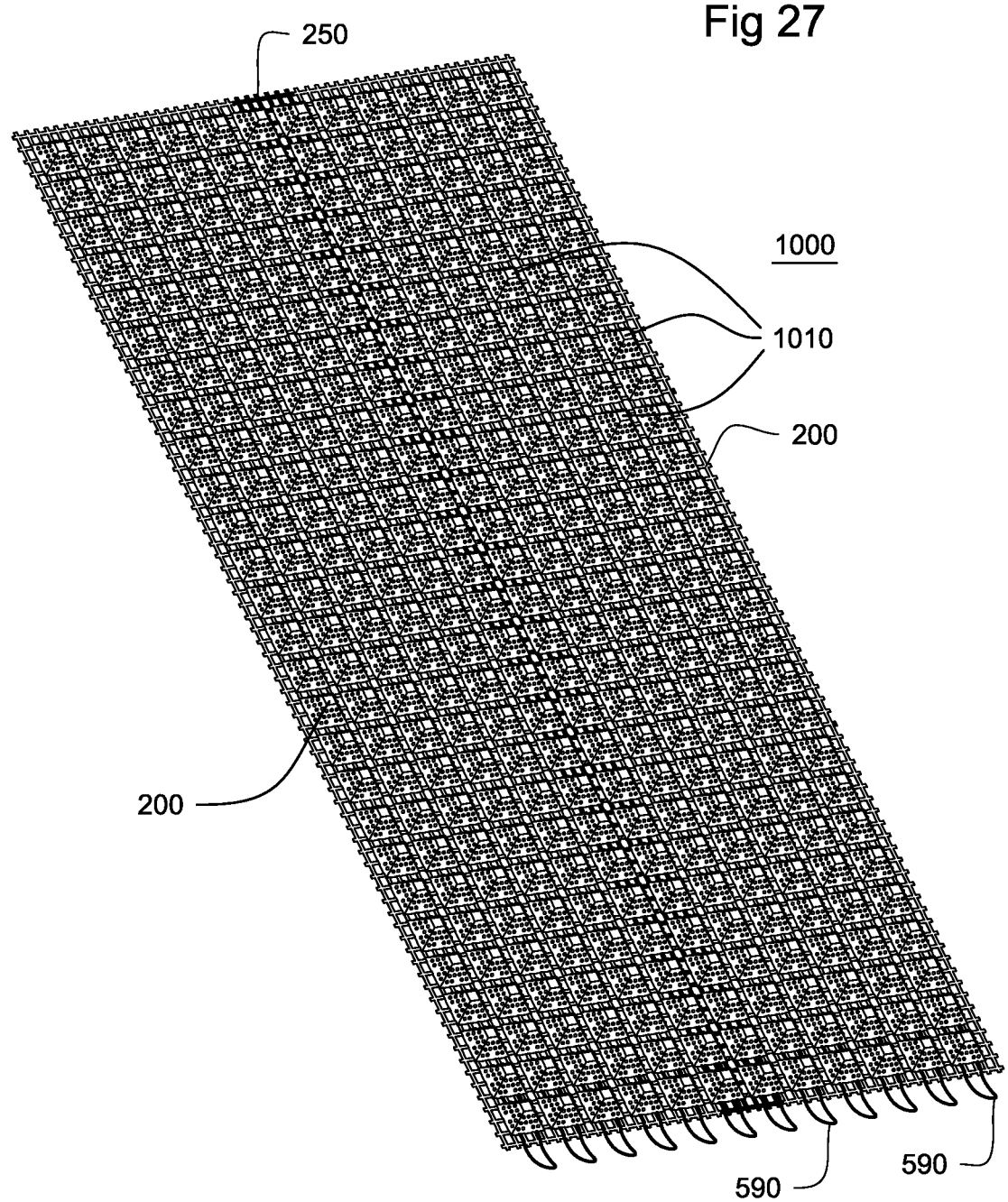
FIG. 27 is a view of a revetment mat using the six molds and six frames shown in FIG. 24.

It should be understood that the size and shape of the grid 200 does not necessarily need to correspond with or exceed the size and shape of the perimeter of mold 100. Generally, commercial grids such as those comprising poly-propylene fibers are packaged in rolls having a width and a length, the length being cut to size when positioning a section of grid 200 adjacent to mold 100 or several molds 100 positioned adjacent to one another. Thus in various embodiments as depicted in FIG. 6, the width and length of grid 200 exceeds the width and length of mold 100. In various embodiments as depicted in FIG. 23, the width of grid 200 exceeds the width of one mold 100 and the length of grid 200 exceeds the length of three molds positioned adjacent to one another. Where the width of grid 200 is insufficient to span the width of mold 100 or two adjacent molds 100 as depicted in FIG. 23, a second grid 200 may be positioned adjacent to the mold 100 or adjacent molds 100 so that cumulatively the grids 200 exceed the width of the mold 100 or adjacent molds 100. When two or more grids 200 are positioned to exceed the width of one mold 100 or adjacent molds 100, it is a preferred embodiment of the method to partially overlap 250 the two or more sections of grid 200 such a portion of the overlap is positioned to become commonly embedded in at least one revetment block 1010 to prevent the separation of the grids 200 when revetment mat 1000 is removed from frame 300 and mold 100.

Figure 9:
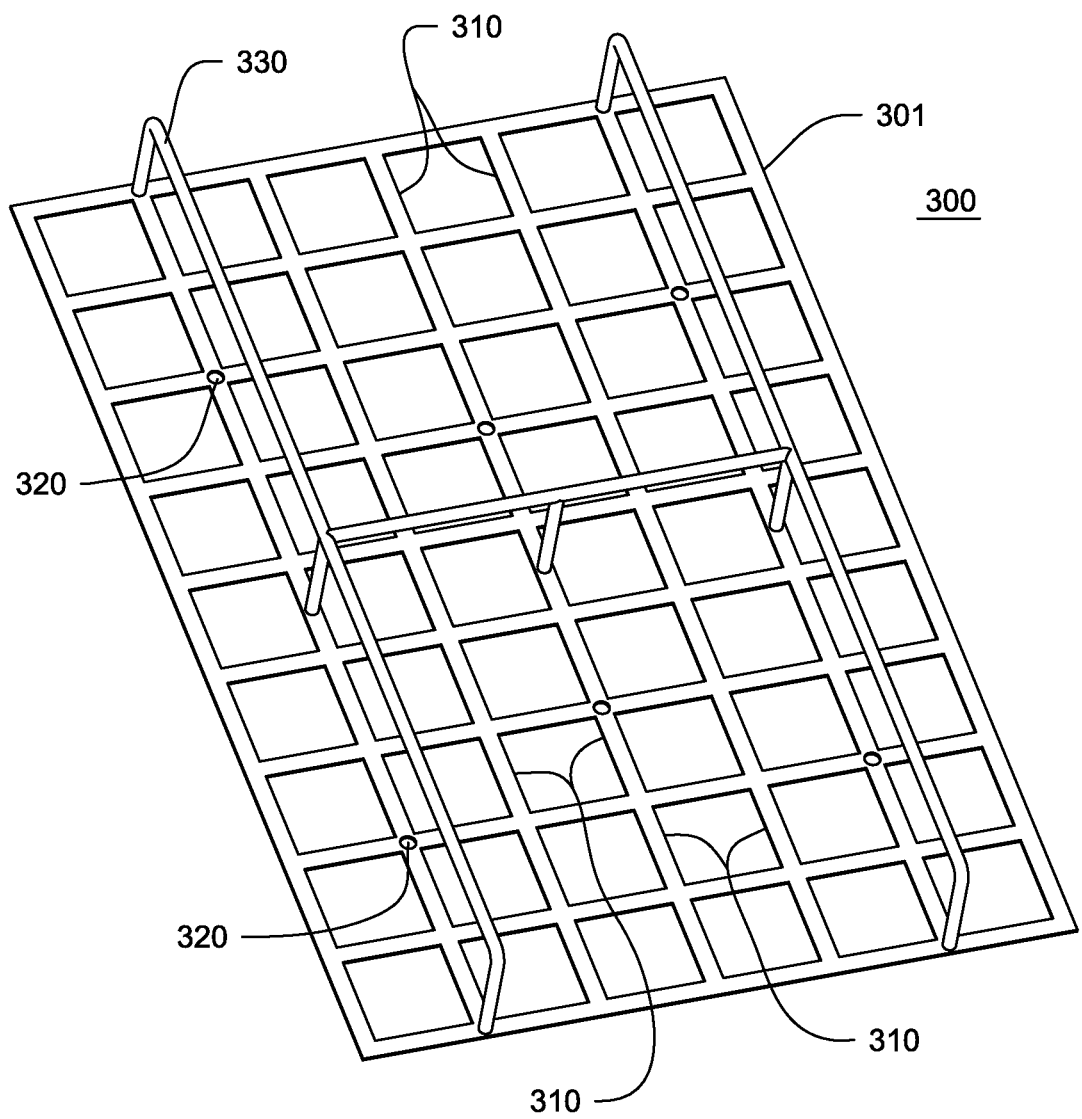
FIG. 9 is a view of one embodiment of a frame comprising a plurality of passages.

Viewing now FIG. 9, the method employs frame 300. In various embodiments, frame 300 comprises body 301 having a first and second side, a plurality of casting passages 310 through body 301, wherein body 301 forms border around each casting passage 310. Frame 300 grip 330 affixed to the second side of body 301. Casting passage 310 of frame 300 is designed to correspond with casting impression 130 of mold 100. It should be understood that the number, arrangement, size and shape of casting passages 310 does not need to correspond with the number, arrangement, size and shape of casting impressions 130 of mold 100. However, do to certain efficiencies, it is a preferred embodiment that the number, arrangement, size and shape of casting passages 310 correspond with the number, arrangement, size and shape of casting impressions 130 of mold 100.

Viewing now FIGS. 10 and 10A, when first side 201 of grid 200 is positioned adjacent to mold 100 and frame 300 is positioned adjacent second side 201 of grid 200 opposite mold 100, each of the plurality of casting impressions 130 of mold 100 is fluidly connected to a casting passage 310 of frame 300 to form a plurality of block casting volumes 700, each volume containing a section of grid 200.

As illustrated in FIGS. 10 and 10A, the borders 900 of frame 300 will preferably align with the borders 901 of casting impressions 130 to form a plurality of barriers 902 enclosing the resulting casting volumes 700. While composite fill 400 may be poured into a casting volume 700 through casting passage 310, barriers 902 will prevent casting fill 400 from flowing from one casting volume 700 to another without overtopping barrier 902. Barriers 902 are positioned between casting volumes 700, such that each casting volume 700 is separated from its neighbors. The result is that each block 1010 is separated from its neighbors in any mat 1000 cast from mold 100.

"Fluid connection" describing the relation between casting impression 130 and casting passage 310 when first side 201 of grid 200 is positioned adjacent to mold 100 and frame 300 is positioned adjacent second side 202 of grid 200 as used herein encompasses the capacity of composite fill 400 to flow through casting passage 310, through grid 200 and into casting impression 130 either passively aided only by gravity or in combination with mechanical means including by not limited to screeding, injecting, and vibrating.

Figure 13:
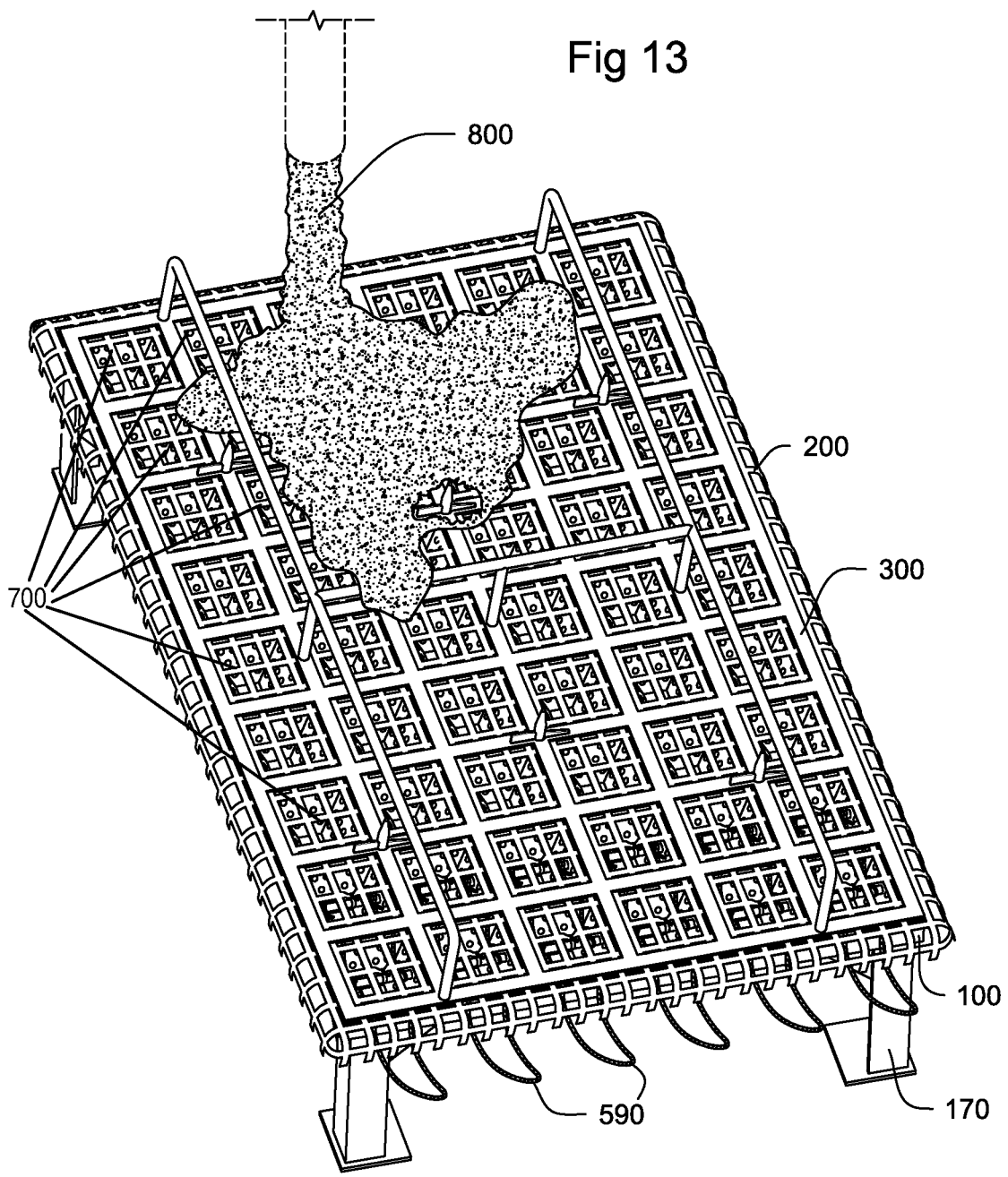
FIG. 13 is a view of one embodiment of composite fill being poured through the frame shown in FIG. 9 and into the plurality of impressions of mold shown in FIG. 1.

Viewing now FIGS. 13, to form revetment mat 1000 comprising grid 200 embedded within a plurality of blocks 1010, composite fill 800 is positioned within the plurality of block casting volumes 700 embedding grid 200 with composite fill 800.

In various embodiments, composite fill 800 is a hardenable paste. In various embodiments composite fill 800 comprises cement paste such as wet cast Portland cement. In various embodiments, composite fill 800 comprises a powder to solid or liquid to solid polymers including for example and without limitation thermosetting resins such as epoxy resins, UV-setting resins such as acrylated urethanes, or heat binding powders such as powdered metals used in direct metal laser sintering. In various embodiments, composite fill 800 further comprises aggregates including but not limited to sand, gravel, or both sand and gravel. Aggregates have an aggregate radius defined by one half of the longest dimension of aggregate used, which in a preferred embodiment is smaller than the aperture radius of apertures 230.

"Fluid connection" describing the relation between casting impression 130 and casting passage 310 when first side 201 of grid 200 is positioned adjacent to mold 100 and frame 300 is positioned adjacent second side 202 of grid 200 as used herein encompasses the capacity of composite fill 400 to flow through casting passage 310, through grid 200 and into casting impression 130 either passively aided only by gravity or in combination with mechanical means including by not limited to screeding, injecting, and vibrating. Therefore, it should be understood that "fluid connection" between mold 100 and frame 300 take into consideration, among other things, the viscosity of composite fill 400, the difference between aperture radius 230 and aggregate radius, and the use of mechanical means.

In various embodiments, composite fill 800 positioned with each block casting volume 700 must cure for a predetermined amount of time to from revetment mat 1000. In various embodiments, heat may be added to accelerate the curing process. Once formed, revetment mat 1000 is removed from mold 100 and frame 300. In various embodiments, composite fill 800 only partially cures before revetment mat 1000 is removed from mold 100 and frame 300.

It may be desired that revetment mat 1000 comprises at least one handle. In various embodiments, method may employ handle 550. While FIG. 1 depicts only one handle 550, it should be understood and as is illustrated in other figures, several handles may be positioned adjacent mold 100.

Viewing now FIG. 4, handle 550 comprises tether 560 attached to first and second anchors 570, 580. Tether 560 may be attached to anchors 570, 580 via tether ties 565, as depicted in the figures, via a knot with tether 550 around anchor 570, 580, not depicted, or any other known means of securing a tether to an anchor. Tether 560 also forms hold 590.

As depicted in FIG. 3A, in various embodiments, first anchor 570 is positioned within first casting impression 131 proximate mold perimeter, second anchor 580 is positioned within second casting impression 132 adjacent first casting impression 131, and hold 590 is positioned beyond mold perimeter.

Viewing now FIG. 4A, handle frame 500 used to construct handle 550 comprises base 501, first and second anchor supports 510, 520 attached to base and first and second guide 511, 521 attached to base 501, and hold guide 530 comprising first, second, and third hold guides 531,532, 533 attached to base 501. In various embodiments, the distance between first anchor support 570 and second anchor support 580 is drawn to the distance between adjacent first and second casting impressions 131, 132, such that first anchor 570 may sit proximate the middle of first casting impression 131 and that second anchor 580 may sit proximate the middle of second casting impression when handle 550 is positioned adjacent mold.

Figure 4B:
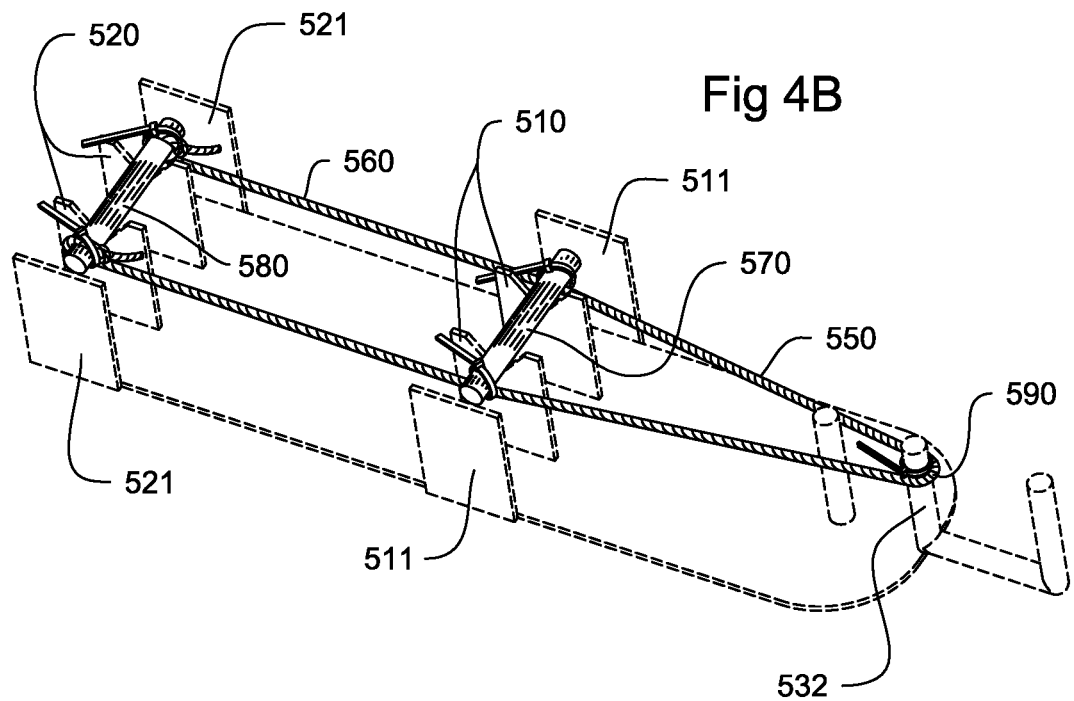
FIG. 4B is a view of the handle shown in FIG. 4 assembled onto the frame shown in FIG. 4A.
Figure 5:
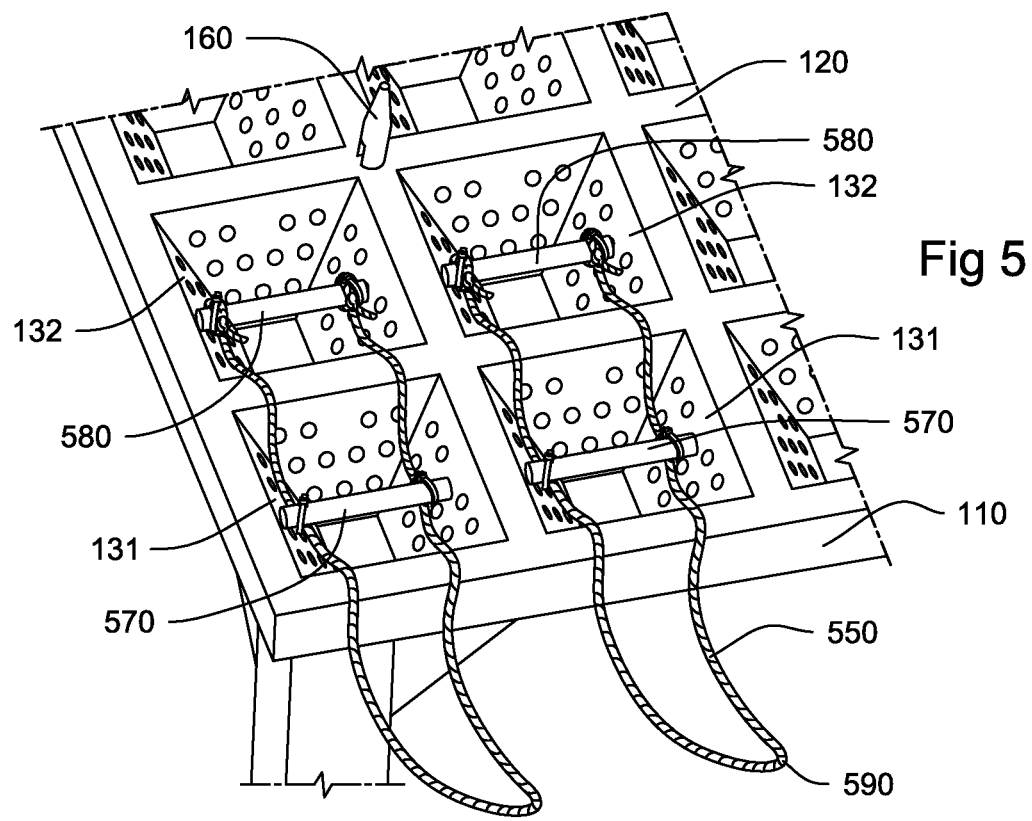
FIG. 5 is view of a portion of the mold shown in FIG. 1 containing two of the handles shown in FIG. 4.

FIG. 4B is a perspective view of handle 550 constructed on handle frame 500. In various embodiments, handle 550 may be positioned adjacent mold 100 prior to positioning composite fill 800 in plurality of block casting volumes 700. In various embodiments, handle 550 is positioned adjacent mold 100 before grid 200 is positioned adjacent mold 100.

Figure 8:
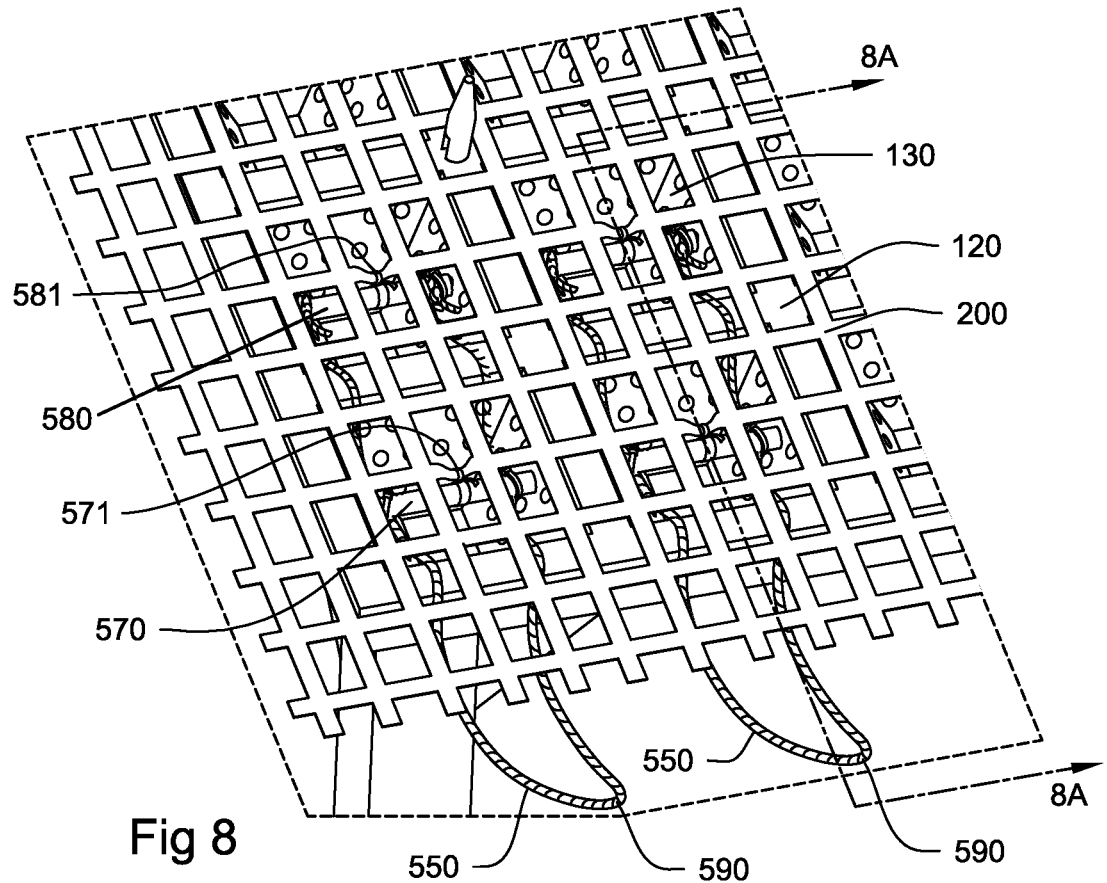
FIG. 8 is a view similar to FIG. 7, wherein two handles, each similar to the one shown in FIG. 4, are tied to the grid.
Figure 8A:
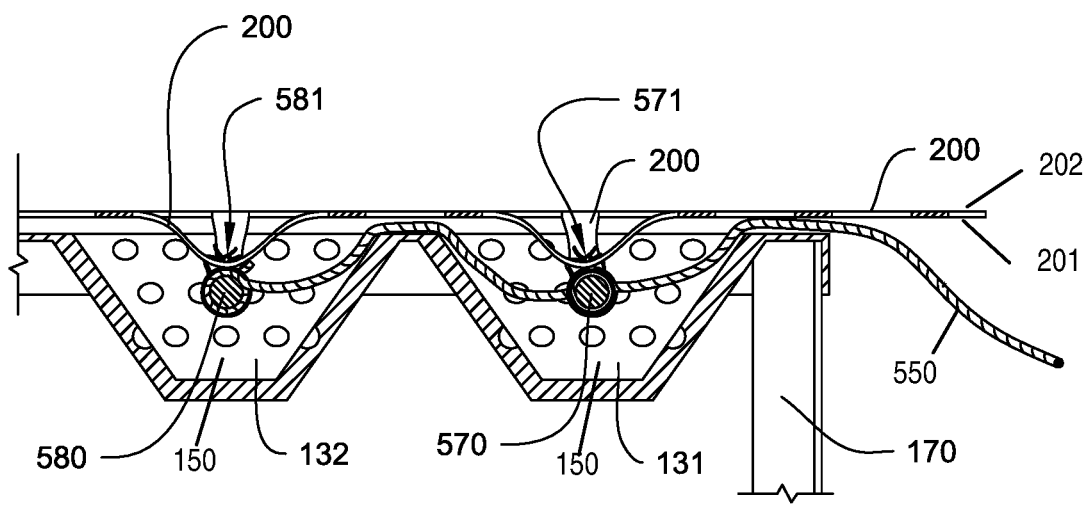
FIG. 8A is a view down line 8A shown in FIG. 8 showing the cross section of two adjacent casting impressions, wherein the handle is tied to the grid.

Viewing now FIG. 8, in various embodiments, first and second anchors 570, 580 are secured to grid 200 via first and second anchor ties 571, 581.

In various embodiments, frame 300 is secured to second side 202 of grid 200 and to the mold surface 120 of mold 100. Now viewing FIG. 2, in various embodiments, mold 100 further comprises at least one aligner 160 affixed to the mold surface 120. Now viewing FIG. 9, in various embodiments, said frame 300 comprises an aligner receiver 320. In various embodiments, when first side 201 of grid 200 is positioned adjacent to mold 100 and frame 300 is positioned adjacent second side 202 of grid 200, aligner 160 and aligner receiver 320 engage with one another to align the plurality of casting passage 310 of frame 300 with plurality of casting impression openings 134 of mold 100.

Figure 12:
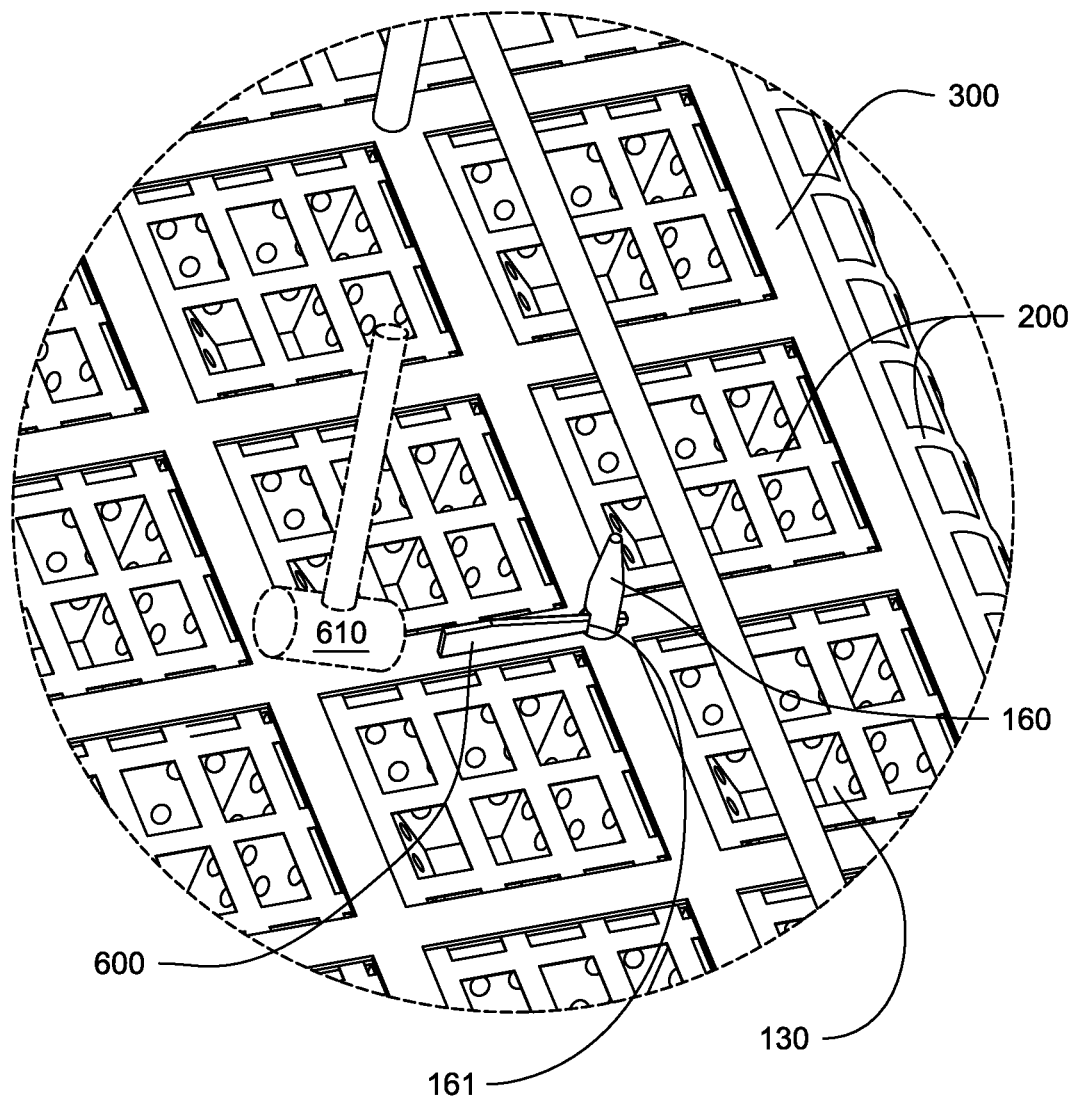
FIG. 12 is a view of the wedge shown in FIG. 11 securing the frame to the grid and mold.

Now viewing FIG. 2, in various embodiments, aligner 160 further comprises slot 161. Now viewing FIG. 12, when first side 201 of grid 200 is positioned adjacent to mold 100 and frame 300 is positioned adjacent second side 202 of grid 200, frame 300 may be secured to grid 200 and mold 100 by hammering 610 wedge 600 through slot 161.

In various embodiments, when the plurality of block casting volumes 700 are being filled with composite fill 800, a portion of composite fill 800 may collect on second side of body 301 of frame 300. Composite fill 800 collecting on second side of body 301 of frame 300 is problematic as it is wasteful and may inhibit separation of revetment mat 1000 from mold 100 and frame 300.

Figure 14:
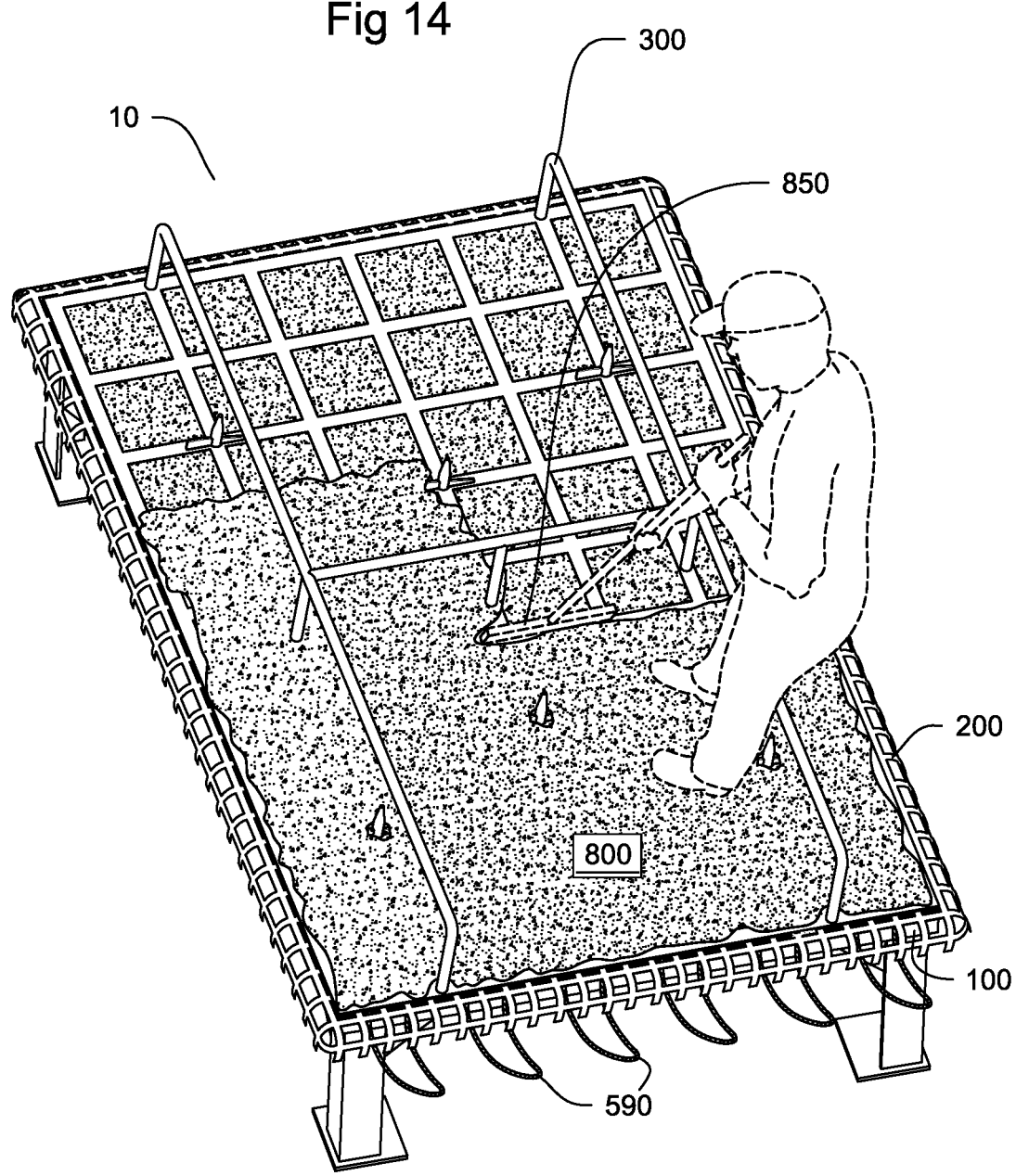
FIG. 14 is a view of a person screeding the composite fill across the top surface of the frame.
Figure 15:
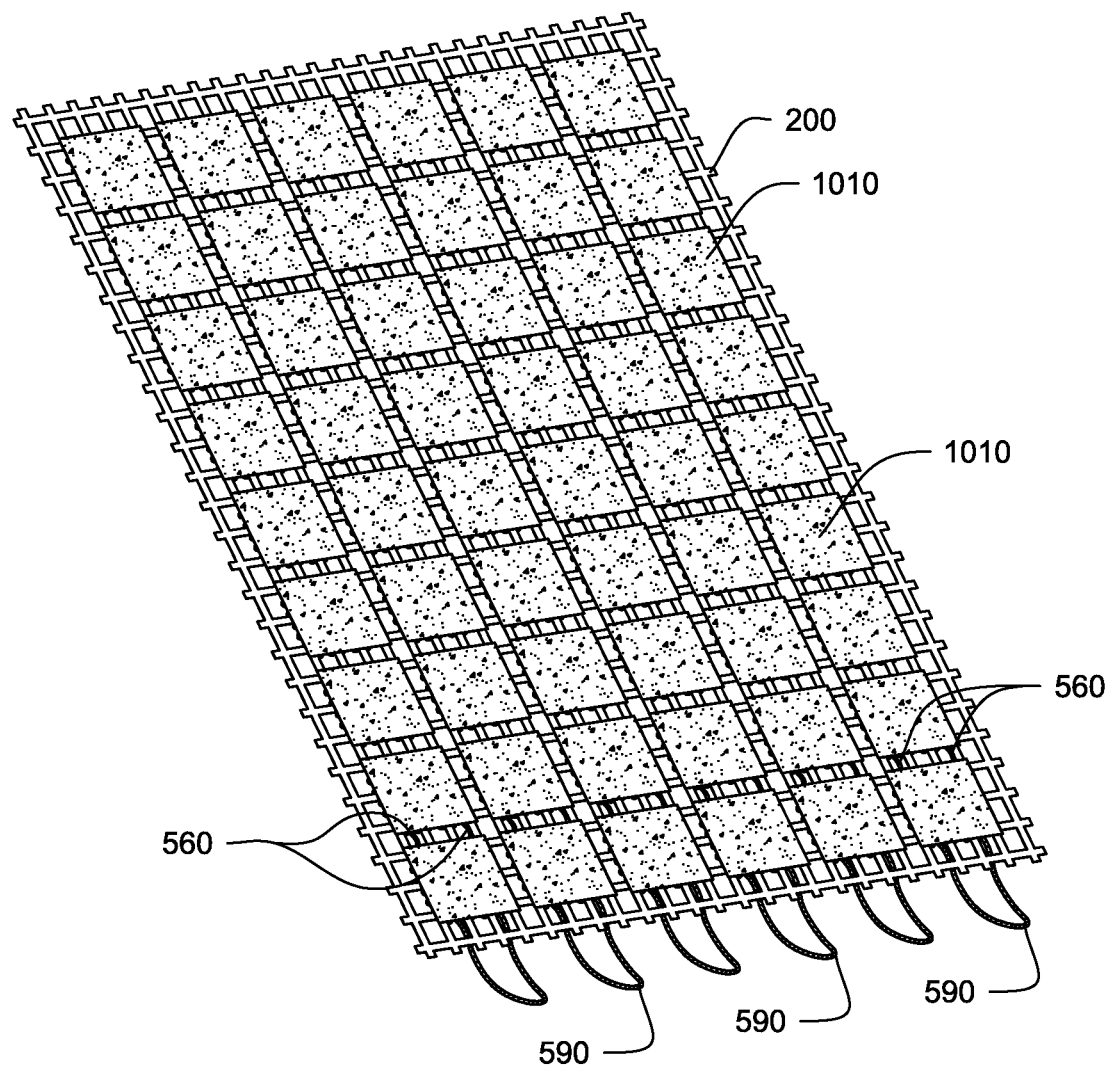
FIG. 15 is a view of one embodiment of a revetment mat formed using the mold, the grid, and the frame shown in FIG. 13.
Figure 16:
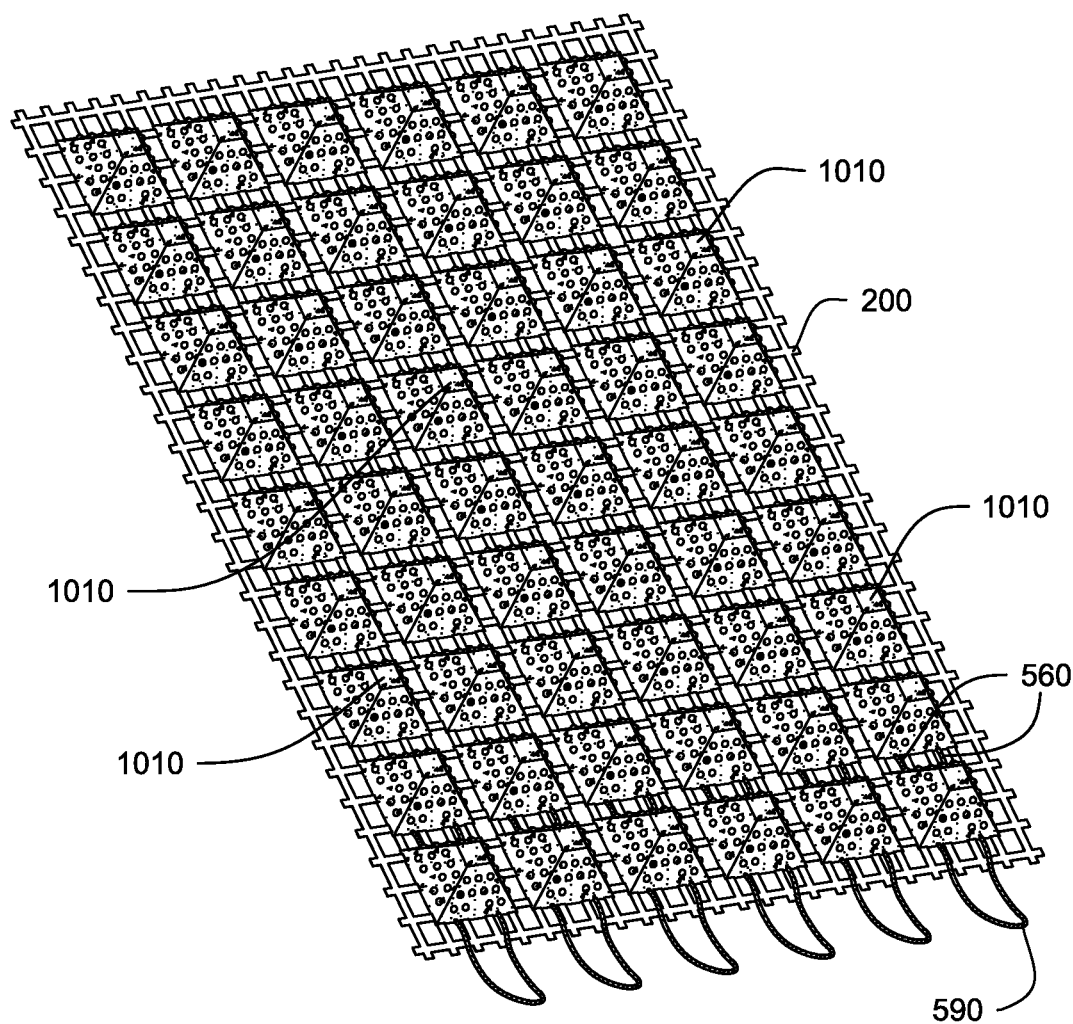
FIG. 16 is another view of the revetment mat shown in FIG. 15.

In order to prevent composite fill 800 from collecting on second side of body 301 of frame 300, in various embodiments composite fill 800 not positioned within any casting impression volume 130 is either repositioned within a casting impression volume 130 or removed as excess. Viewing now FIG. 14, in various embodiments, screeding 850 composite fill 800 across the second side of body 301 of frame 300 is a known method of either repositioning or removing composite fill 800.

Figure 17:
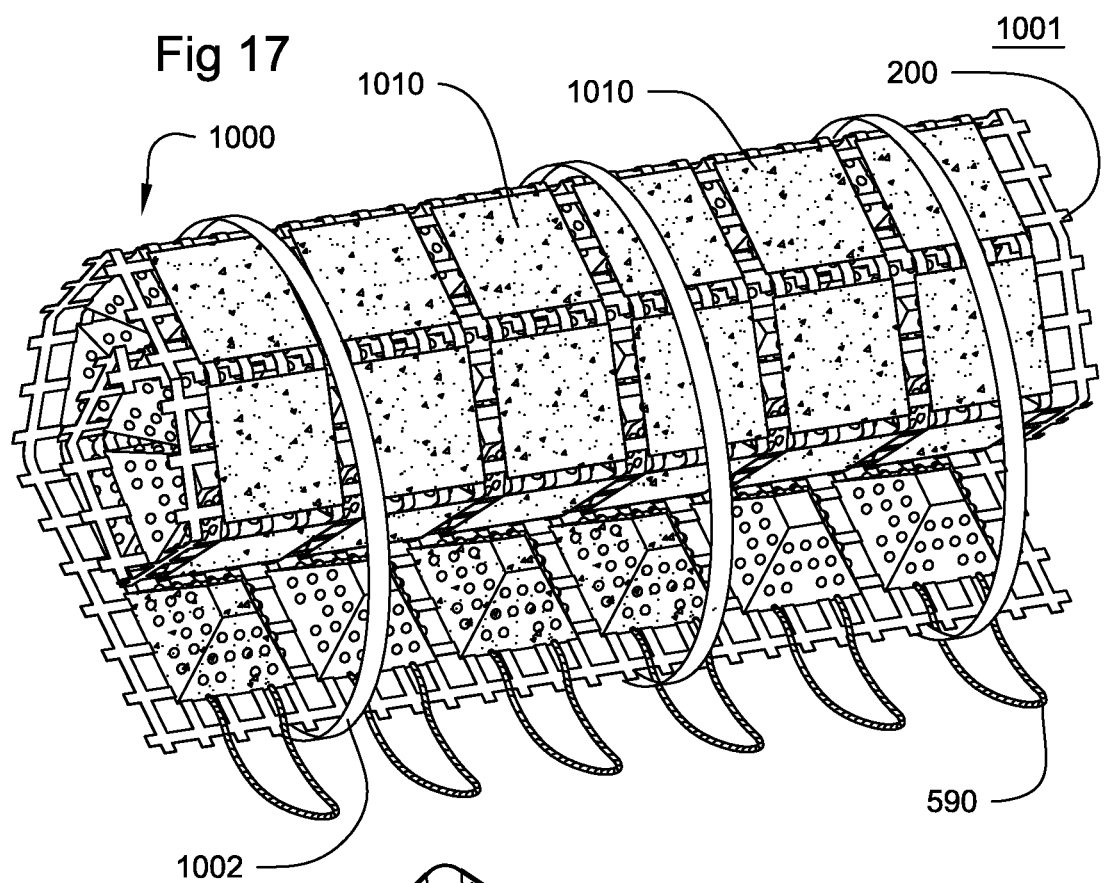
FIG. 17 is a view of the revetment mat shown in FIG. 15 rolled and strapped for packaging and storage.
Figure 18:
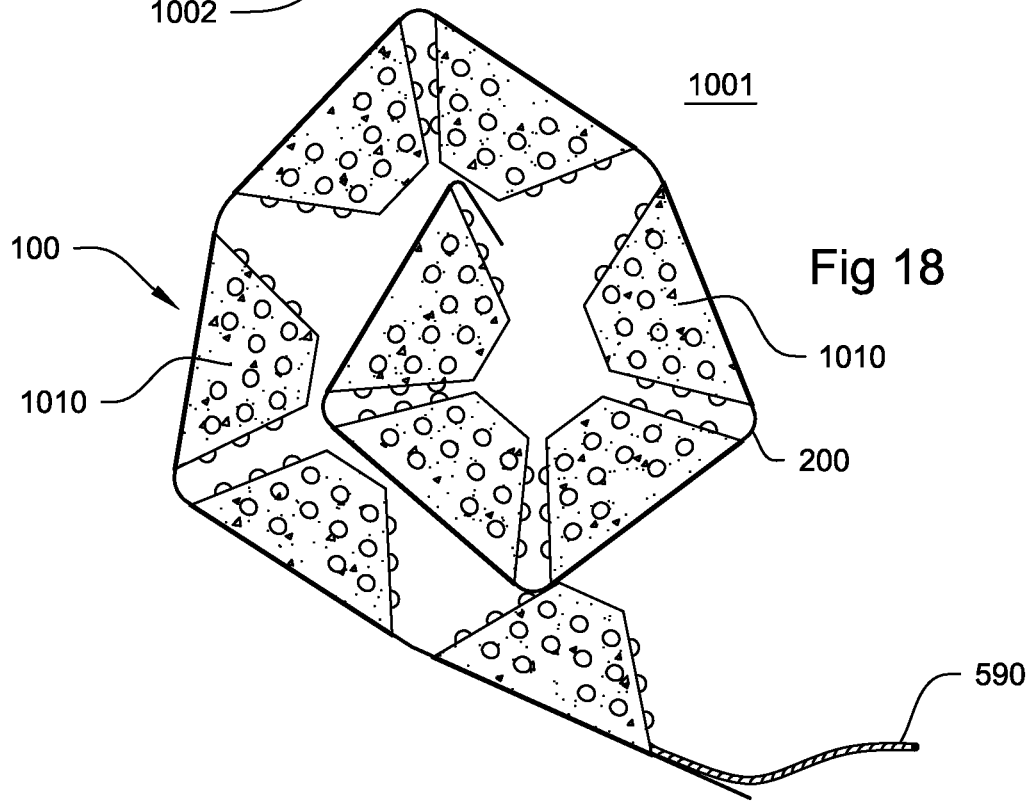
FIG. 18 is another view of the revetment mat shown in FIG. 17.
Figure 19:
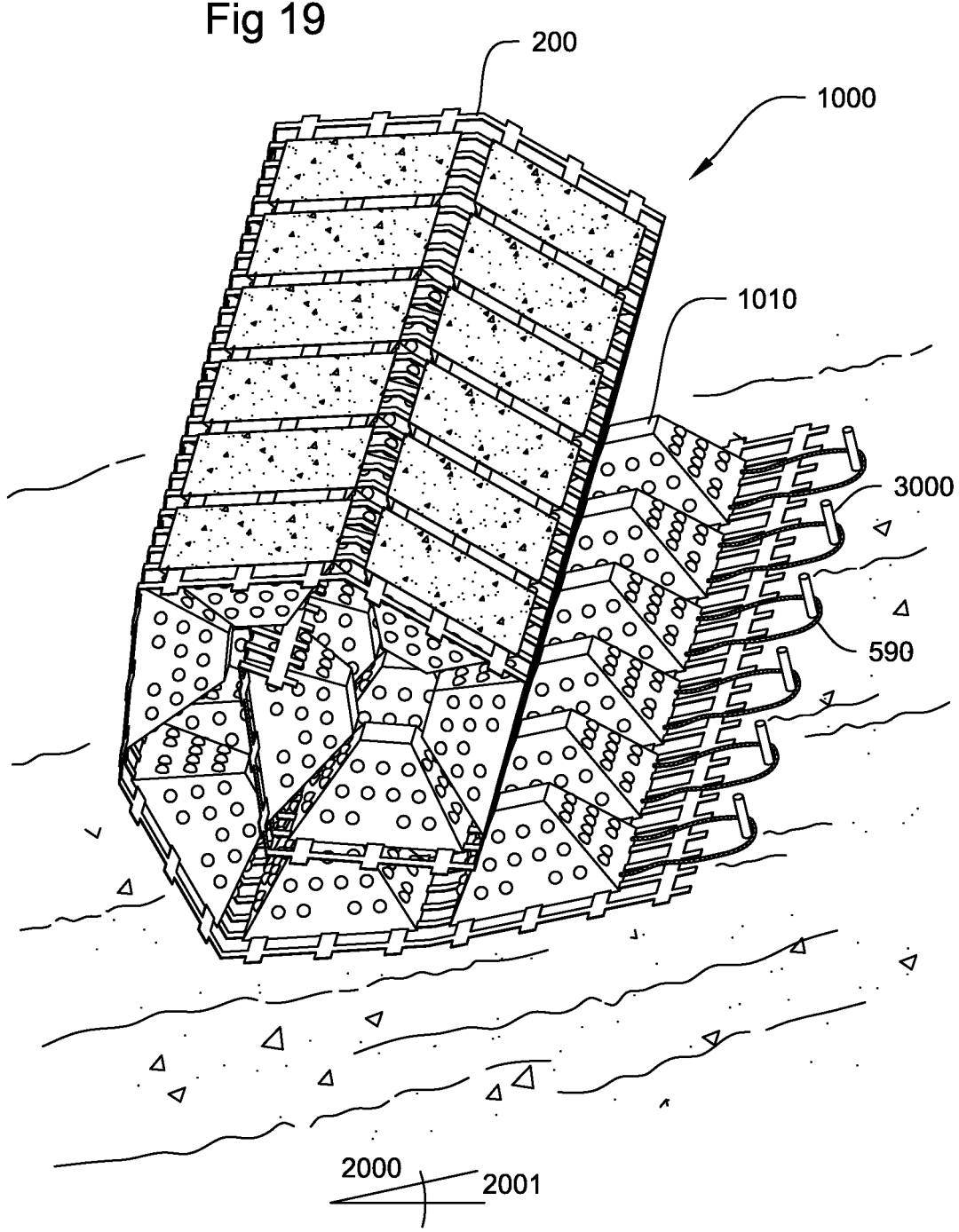
FIG. 19 is a view of the revetment mat shown in FIG. 15 being installed on an earthen surface.
Figure 20:
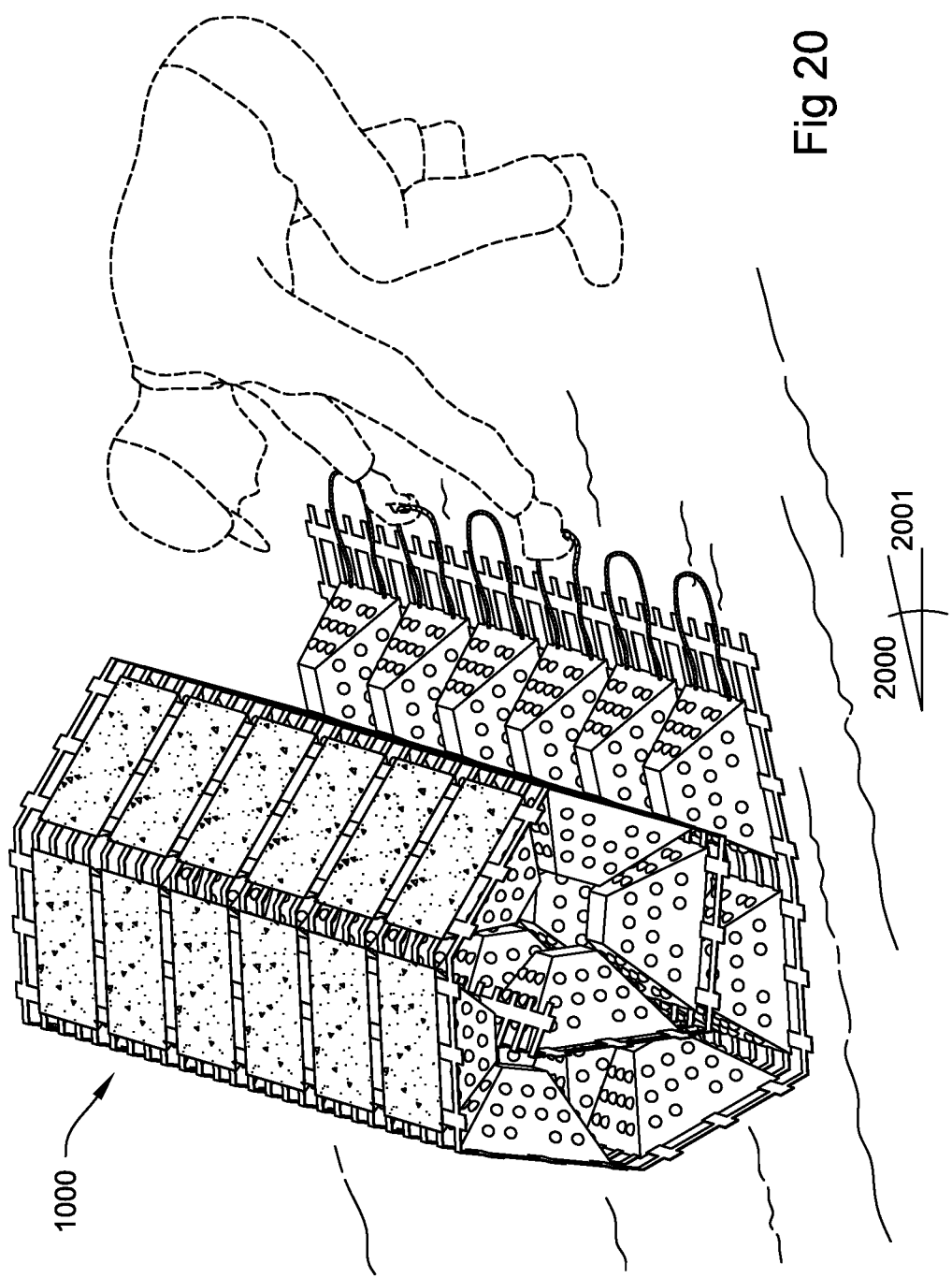
FIG. 20 is another view of the revetment mat shown in FIG. 15 being installed on an earthen surface.
Figure 21:
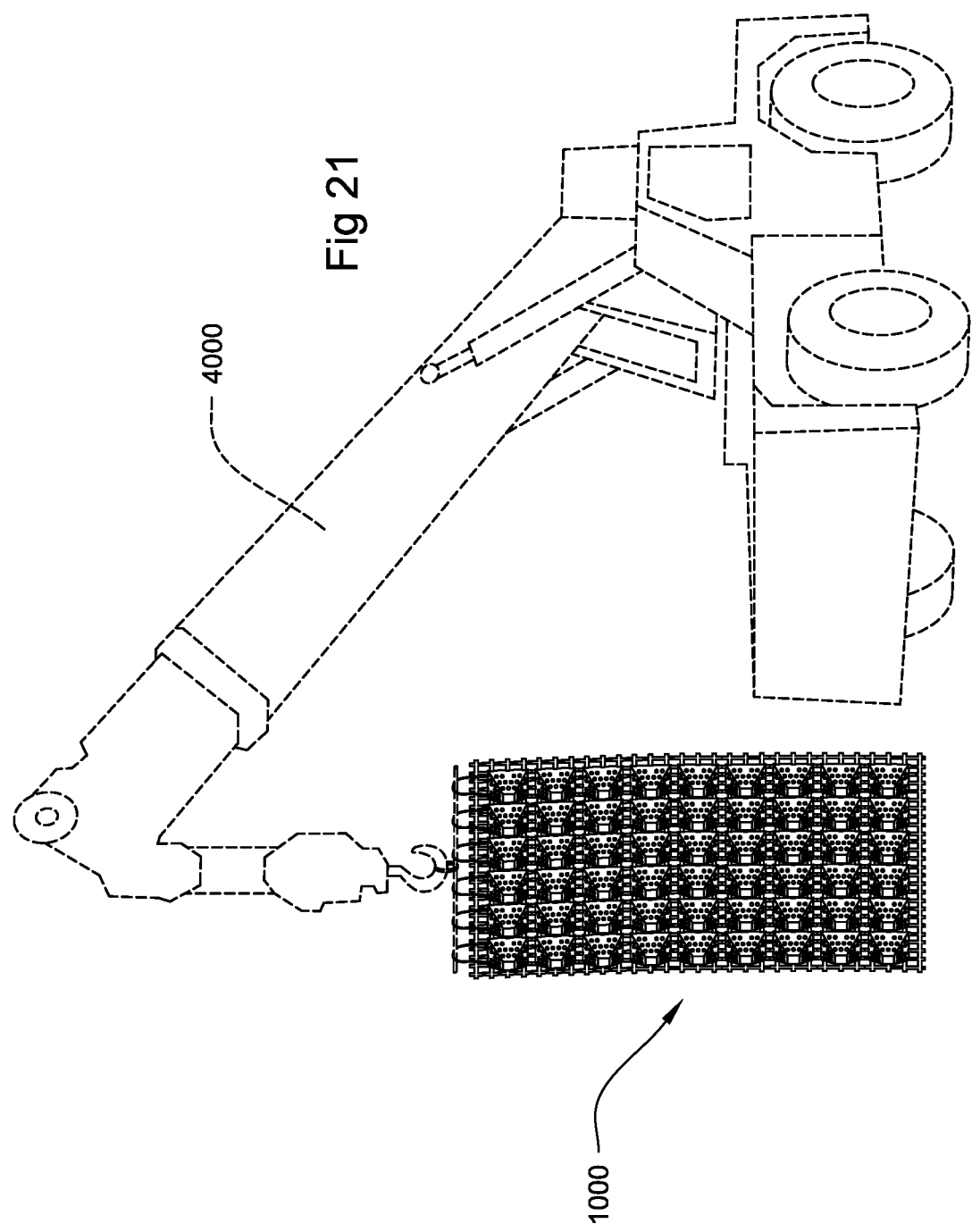
FIG. 21 is a view of the revetment mat shown in FIG. 15 being lifted for installation by a front loader or other heavy equipment.
Figure 22:
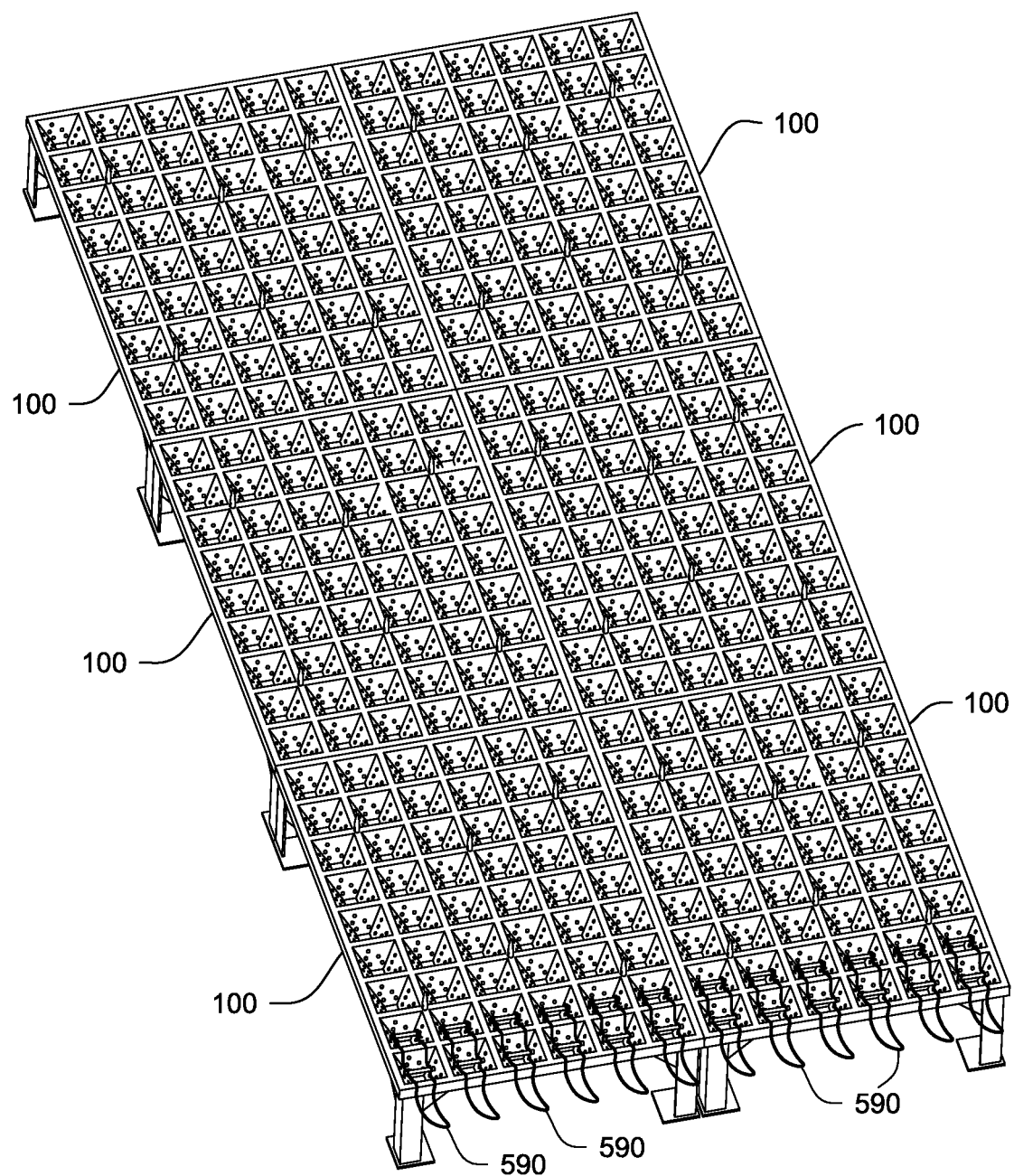
FIG. 22 is a view of six molds, each mold similar to the one shown in FIG. 1, positioned adjacent one another in a two by three pattern.

Now viewing FIG. 17, in various embodiments, revetment mat 1000 is rolled for storage and shipping. To maintain rolled form during storage or shipment, straps 1002 may be used. Now viewing FIGS. 19 and 20, in various embodiments where revetment mat 1000 is rolled, revetment mat 1000 may be installed by unrolling revetment mat on earthen surface 2000 with gradient 2001. As depicted in FIG. 19, stakes 3000 may be used with hold 590 of handle 550 to install revetment mat 1000. As depicted in FIG. 20, hold 590 of handle may be used to install revetment mat 1000. As depicted in FIG. 21, heavy lifting equipment 4000 may be used to install revetment mat 1000.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential.

We claim:

1. A mold for making a revetment mat wherein the mold comprises:
    an array comprising a plurality of casting impressions;
    each of said plurality of casting impressions configured to receive and retain a composite fill, said plurality of casting impressions each having a closed bottom surface having a surface area and an open top surface defined by a border surrounding said open top surface; each of said plurality of casting impressions further comprising a plurality of impression walls extending between said closed bottom surface and said open top surface, wherein said impression walls are angled relative to said closed bottom surface and said open top surface to create a surface area of said open top surface larger than said surface area of said closed bottom surface;
    wherein said plurality of casting impressions are arranged in a plurality of parallel rows to form said array, wherein the casting impressions in a first of said plurality of rows and the casting impressions in a row adjacent to said first row have impression walls that face each other and wherein said facing impression walls angle away from each other from the perspective of the open top surface of each casting impression;
    wherein said borders surrounding said open top surfaces of said plurality of casting impressions within said array are coplanar, said coplanar borders forming an upper surface of said array;
    a frame having an upper surface and a lower surface, wherein said lower surface of said frame is configured to removably rest over said upper surface of said array, said frame comprising a plurality of interlocking columns and rows arranged to define a plurality of casting passages, said interlocking columns and rows sized and positioned to align with said borders surrounding said open top surfaces of said casting impressions when said frame is in place over said array, wherein said interlocking columns and rows and said borders are configured to combine to form a plurality of barriers surrounding each of said plurality of casting impressions when said frame is in place over said upper surface of said array, wherein said plurality of casting passages in said frame provide a fluid connection to said plurality of casting impressions when said frame is in place over said array, and wherein said barriers are configured to retain fill between said upper surface of said frame and said open top surface of each of said plurality of casting impressions when said frame is in place and said casting impressions are full and wherein each of said plurality of casting passages substantially match the surface area of one of said open top surfaces of said casting impressions when said frame is in place over said array.

2. The mold for making a revetment mat according to claim 1 wherein said barriers are configured and sized to space each of said casting impressions from every adjacent one of said plurality of casting impressions and to prevent a fluid connection between said plurality of casting impressions without overtopping said barriers.

3. The mold for making a revetment mat according to claim 2 wherein said open top surface is parallel to said closed bottom surface.

4. The mold for making a revetment mat according to claim 3 wherein said closed bottom surfaces of said plurality of casting impressions are flat.

5. The mold for making a revetment mat according to claim 4 wherein said closed bottom surfaces of said plurality of casting impressions are coplanar.

6. The mold for making a revetment mat according to claim 1 wherein said impression walls include a plurality of indentations configured to form hydraulic jumps.

7. The mold for making a revetment mat according to claim 1 further comprising a means for securing the frame to the array, wherein the frame and the array each have an interior and the means for securing the frame to the array is positioned in the interior of the frame and the interior of the array.

8. The mold for making a revetment mat according to claim 7 wherein the means for securing the frame to the array comprises a mated slot and wedge.

* * * * *